(12) United States Patent
Miyakawa

(10) Patent No.: US 8,656,010 B2
(45) Date of Patent: Feb. 18, 2014

(54) DATA USE STATUS TRACKING SYSTEM, MANAGER DEVICE, AGENT DEVICE, DATA USE STATUS TRACKING METHOD, AND STORAGE MEDIUM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 12/922,055

(22) PCT Filed: Apr. 24, 2009

(86) PCT No.: PCT/JP2009/001879
§ 371 (c)(1),
(2), (4) Date: Sep. 10, 2010

(87) PCT Pub. No.: WO2009/130912
PCT Pub. Date: Oct. 29, 2009

(65) Prior Publication Data
US 2011/0035492 A1     Feb. 10, 2011

(30) Foreign Application Priority Data
Apr. 25, 2008  (JP) ................................ 2008-115261

(51) Int. Cl.
*G06F 15/173* (2006.01)
(52) U.S. Cl.
USPC .......................................... 709/224; 709/219
(58) Field of Classification Search
USPC ....................................................... 709/224
See application file for complete search history.

(56) References Cited

U.S. PATENT DOCUMENTS

| 7,590,547 B2* | 9/2009 | Lagadec et al. ............... 705/307 |
| 7,630,986 B1* | 12/2009 | Herz et al. ............................ 1/1 |
| 8,103,259 B2* | 1/2012 | Gravel et al. ............... 455/414.2 |
| 2002/0083163 A1* | 6/2002 | Collazo ........................ 709/223 |
| 2003/0200305 A1* | 10/2003 | Tarby et al. ................... 709/224 |
| 2004/0073533 A1* | 4/2004 | Mynarski et al. ................. 707/1 |
| 2006/0095787 A1* | 5/2006 | Aaron ............................. 713/184 |
| 2006/0294024 A1 | 12/2006 | Hatakeyama et al. |

FOREIGN PATENT DOCUMENTS

| JP | 10-40049 A | 2/1998 |
| JP | 2004517377 A | 6/2004 |
| JP | 2006344156 A | 12/2006 |
| JP | 2008065695 A | 3/2008 |

OTHER PUBLICATIONS

International Search Report for PCT/JP2009/001879 mailed Jun. 2, 2009.
European Search Report for EP09735394.0 dated Dec. 6, 2012.
EPO Form 1224 dated on Jan. 2, 2013.

* cited by examiner

*Primary Examiner* — Christopher Biagini
(74) *Attorney, Agent, or Firm* — Sughrue Mion, PLLC

(57) ABSTRACT

A data use status tracking system 100 includes: a terminal device 1 that generates and transmits data; and a manager device 2 that receives the data transmitted from the terminal device. The manager device 2 includes: a process history storing unit 25; a processing unit 22 that processes the data received from the terminal device 1 and registers a process history including the process details of the data in the process history storing unit 25; and a referring unit 23 that receives a process history reference request designating a part or all of the process histories registered in the process history storing unit 25 from the terminal device 1 and transmits, as a response, out of counting results obtained by counting the process histories designated by the process history reference request with respect to a plurality of counting items, the counting result related to the counting item according to the type of the terminal device 1 to the terminal device 1.

27 Claims, 25 Drawing Sheets

FIG. 5

| ID | TYPE | PROVIDER ID | PROCESS TYPE | PROCESS DEVICE | PROCESS DATE |
|---|---|---|---|---|---|
| 00001 | POSITION | PROVIDER A | DISCLOSURE | MGR | 02011000 |
| 00002 | POSITION | PROVIDER A | DISCLOSURE | MGR | 02011000 |
| 00003 | POSITION | PROVIDER A | DISCLOSURE | MGR | 02011000 |
| 00001 | POSITION | PROVIDER A | STORAGE | MGR | 02011030 |
| 00002 | POSITION | PROVIDER A | STORAGE | MGR | 02011030 |
| 00003 | POSITION | PROVIDER A | STORAGE | MGR | 02011030 |
| 00001 | POSITION | PROVIDER A | CONCEALMENT | MGR | 02011045 |
| 00002 | POSITION | PROVIDER A | CONCEALMENT | MGR | 02011045 |
| 00003 | POSITION | PROVIDER A | CONCEALMENT | MGR | 02011045 |
| 00001 | POSITION | PROVIDER A | TRANSMISSION (AGT1) | MGR | 02011200 |
| 00002 | POSITION | PROVIDER A | TRANSMISSION (AGT1) | MGR | 02011200 |
| 00003 | POSITION | PROVIDER A | TRANSMISSION (AGT1) | MGR | 02011200 |
| ... | ... | ... | ... | ... | ... |

FIG. 6

| ID | TYPE | PROVIDER ID | PROCESS TYPE | PROCESS DEVICE | PROCESS DATE |
|---|---|---|---|---|---|
| 00001 | POSITION | PROVIDER A | RECEPTION (MGR) | AGT1 | 02011300 |
| 00002 | POSITION | PROVIDER A | RECEPTION (MGR) | AGT1 | 02011300 |
| 00003 | POSITION | PROVIDER A | RECEPTION (MGR) | AGT1 | 02011300 |
| 00001 | POSITION | PROVIDER A | DISCLOSURE | AGT1 | 02011330 |
| 00002 | POSITION | PROVIDER A | DISCLOSURE | AGT1 | 02011330 |
| 00003 | POSITION | PROVIDER A | DISCLOSURE | AGT1 | 02011330 |
| ... | ... | ... | ... | ... | ... |

FIG. 7

| ID | TYPE | PROVIDER ID | PROCESS TYPE | PROCESS DEVICE | PROCESS DATE | |
|---|---|---|---|---|---|---|
| 00001 | POSITION | PROVIDER A | DISCLOSURE | MGR | 02011000 | |
| 00002 | POSITION | PROVIDER A | DISCLOSURE | MGR | 02011000 | |
| 00003 | POSITION | PROVIDER A | DISCLOSURE | MGR | 02011000 | |
| 00001 | POSITION | PROVIDER A | STORAGE | MGR | 02011030 | |
| 00002 | POSITION | PROVIDER A | STORAGE | MGR | 02011030 | |
| 00003 | POSITION | PROVIDER A | STORAGE | MGR | 02011030 | 71 |
| 00001 | POSITION | PROVIDER A | CONCEALMENT | MGR | 02011045 | |
| 00002 | POSITION | PROVIDER A | CONCEALMENT | MGR | 02011045 | |
| 00003 | POSITION | PROVIDER A | CONCEALMENT | MGR | 02011045 | |
| 00001 | POSITION | PROVIDER A | TRANSMISSION (AGT1) | MGR | 02011200 | |
| 00002 | POSITION | PROVIDER A | TRANSMISSION (AGT1) | MGR | 02011200 | |
| 00003 | POSITION | PROVIDER A | TRANSMISSION (AGT1) | MGR | 02011200 | |
| ... | ... | ... | ... | ... | ... | |
| 00001 | POSITION | PROVIDER A | RECEPTION (MGR) | AGT1 | 02011300 | |
| 00002 | POSITION | PROVIDER A | RECEPTION (MGR) | AGT1 | 02011300 | |
| 00003 | POSITION | PROVIDER A | RECEPTION (MGR) | AGT1 | 02011300 | |
| 00001 | POSITION | PROVIDER A | DISCLOSURE | AGT1 | 02011330 | 72 |
| 00002 | POSITION | PROVIDER A | DISCLOSURE | AGT1 | 02011330 | |
| 00003 | POSITION | PROVIDER A | DISCLOSURE | AGT1 | 02011330 | |
| ... | ... | ... | ... | ... | ... | |

FIG. 8

| DATA USE STATUS | | |
|---|---|---|
| PROCESS DEVICE | TYPE | NUMBER OF TIMES |
| MGR | POSITION INFORMATION | 3 TIMES |
| AGT1 | POSITION INFORMATION | 3 TIMES |

FIG. 9

| PROCESS DEVICE | TYPE | PROCESS TYPE | NUMBER OF TIMES |
|---|---|---|---|
| MGR | POSITION INFORMATION | DISCLOSURE | 3 TIMES |
| MGR | POSITION INFORMATION | STORAGE | 3 TIMES |
| MGR | POSITION INFORMATION | CONCEALMENT | 3 TIMES |
| MGR | POSITION INFORMATION | TRANSMISSION | 3 TIMES |
| AGT1 | POSITION INFORMATION | RECEPTION | 3 TIMES |
| AGT1 | POSITION INFORMATION | DISCLOSURE | 3 TIMES |

DATA USE STATUS

FIG. 13

| PROVIDER ID | TYPE | PROCESS DEVICE | PERIOD | NUMBER OF TIMES |
|---|---|---|---|---|
| PROVIDER A | POSITION | MGR | 2008/2 | 3 |
| PROVIDER A | POSITION | AGT1 | 2008/2 | 3 |
| PROVIDER B | ... | ... | ... | ... |
| ... | ... | ... | ... | ... |

| PROVIDER ID | TYPE | PROCESS TYPE | PROCESS DEVICE | PERIOD | NUMBER OF TIMES |
|---|---|---|---|---|---|
| PROVIDER A | POSITION | DISCLOSURE | MGR | 2008/2 | 3 |
| PROVIDER A | POSITION | STORAGE | MGR | 2008/2 | 3 |
| PROVIDER A | POSITION | CONCEALMENT | MGR | 2008/2 | 3 |
| PROVIDER A | POSITION | TRANSMISSION (AGT1) | MGR | 2008/2 | 3 |
| PROVIDER A | POSITION | RECEPTION (MGR) | AGT1 | 2008/2 | 3 |
| PROVIDER A | POSITION | DISCLOSURE | AGT1 | 2008/2 | 3 |
| PROVIDER B | ... | ... | ... | ... | ... |
| ... | ... | ... | ... | ... | ... |

| ID | TYPE | PROVIDER ID | PROCESS TYPE | PROCESS DEVICE | PROCESS DATE |
|---|---|---|---|---|---|
| 00001 | POSITION | PROVIDER A | DISCLOSURE | MGR | 02011000 |
| 00002 | POSITION | PROVIDER A | DISCLOSURE | MGR | 02011000 |
| 00003 | POSITION | PROVIDER A | DISCLOSURE | MGR | 02011000 |
| 00001 | POSITION | PROVIDER A | STORAGE (PKEY1) | MGR | 02011030 |
| 00002 | POSITION | PROVIDER A | STORAGE (PKEY2) | MGR | 02011030 |
| 00003 | POSITION | PROVIDER A | STORAGE (PKEY3) | MGR | 02011030 |
| 00001 | POSITION | PROVIDER A | CONCEALMENT | MGR | 02011045 |
| 00002 | POSITION | PROVIDER A | CONCEALMENT | MGR | 02011045 |
| 00003 | POSITION | PROVIDER A | CONCEALMENT | MGR | 02011045 |
| 00001 | POSITION | PROVIDER A | TRANSMISSION (AGT1) | MGR | 02011200 |
| 00002 | POSITION | PROVIDER A | TRANSMISSION (AGT1) | MGR | 02011200 |
| 00003 | POSITION | PROVIDER A | TRANSMISSION (AGT1) | MGR | 02011200 |
| ... | ... | ... | ... | ... | ... |

FIG. 21

| PRIMARY KEY | DETAILS |
|---|---|
| PKEY1 | AREA 2 (D1) |
| PKEY2 | AREA 1 (D2) |
| PKEY3 | AREA 3 (D3) |
| ... | ... |

FIG. 22

| PRIMARY KEY | DETAILS |
|---|---|
| PKEY1 | — |
| PKEY2 | — |
| PKEY3 | — |
| ... | ... |

FIG. 23

| ID | TYPE | PROVIDER ID | PROCESS TYPE | PROCESS DEVICE | PROCESS DATE |
|---|---|---|---|---|---|
| 00001 | POSITION | PROVIDER A | RECEPTION (MGR) | AGT1 | 02011300 |
| 00002 | POSITION | PROVIDER A | RECEPTION (MGR) | AGT1 | 02011300 |
| 00003 | POSITION | PROVIDER A | RECEPTION (MGR) | AGT1 | 02011300 |
| 00001 | POSITION | PROVIDER A | DISCLOSURE | AGT1 | 02011330 |
| 00002 | POSITION | PROVIDER A | DISCLOSURE | AGT1 | 02011330 |
| 00003 | POSITION | PROVIDER A | DISCLOSURE | AGT1 | 02011330 |
| 00001 | POSITION | PROVIDER A | STORAGE (PKEYe1) | AGT1 | 02011400 |
| 00002 | POSITION | PROVIDER A | STORAGE (PKEYe2) | AGT1 | 02011400 |
| 00003 | POSITION | PROVIDER A | STORAGE (PKEYe3) | AGT1 | 02011400 |
| ... | ... | ... | ... | ... | ... |

FIG. 24

| PRIMARY KEY | DETAILS |
|---|---|
| PKEYe1 | AREA 2 (D1) |
| PKEYe2 | AREA 1 (D2) |
| PKEYe3 | AREA 3 (D3) |
| ... | ... |

FIG. 25

| PRIMARY KEY | DETAILS |
|---|---|
| PKEYe1 | — |
| PKEYe2 | — |
| PKEYe3 | — |
| ... | ... |

DATA USE STATUS TRACKING SYSTEM, MANAGER DEVICE, AGENT DEVICE, DATA USE STATUS TRACKING METHOD, AND STORAGE MEDIUM

The present application is the National Phase of PCT/JP2009/001879, filed Apr. 24, 2009, which claims priority from Japanese Patent Application No. 2008-115261 filed on Apr. 25, 2008, the content of which is hereby incorporated by reference into the application.

TECHNICAL FIELD

The present invention relates to a data use status tracking system and a data use status tracking method capable of checking a use status of data provided for a server or the like via a network by a data provider. The invention also relates to a manager device, an agent device, and a storage medium assembled in the data use status tracking system.

BACKGROUND ART

In recent years, data such as privacy data is provided from a terminal device of a user to a server, and the user receives service based on the provided data. The privacy data denotes data specifying or characterizing an individual person, such as name, date of birth, telephone, present-position information, and purchase information. By providing the privacy data, the user can receive provision of service specialized for the user himself/herself.

However, when the user provides data such as the privacy data, in many cases, the user feels anxious about how the data is used. As a method for lessening such anxiety, for example, a method for providing a mechanism in which the provider can check how the data is used is considered.

A technique of this kind is disclosed in Patent Document 1. A system described in Patent Document 1 has a transmitter that provides digital content, a receiver that uses the digital content, and a server that receives the digital content from the transmitter and transmits it to the receiver. When the digital content is operated, the receiver registers a process history indicative of the operation in a local database provided in itself. The process history registered in the local database is always transmitted to the server. The server registers the process history transmitted from the receiver into a center database provided in the server itself. The user of the transmitter (the provider of the digital content) can be connected to the server and refer to a result of counting on the process history registered in the center database.

[Patent Document 1] Japanese Patent Application National Publication (Laid-Open) No. 2004-517377

DISCLOSURE OF THE INVENTION

With the technique described in the Patent Document 1, the user of the transmitter (the provider of the digital content) can check how data provided by himself/herself is used.

However, the technique described in the Patent Document 1 has the following problem since the type of the transmitter (terminal device) which refers to the counting result is not considered.

Various terminal devices exist. For example, a terminal device having a large display region and a terminal device having a small display region exist. A terminal device having a high display processing speed and a terminal device having a low display processing speed exist. In the Patent Document 1, without considering such types of terminal devices, a counting result obtained by the same counting method (a counting result in which the number of counting items is the same) is transmitted to the terminal devices.

For example, in the case of transmitting counting results of a number of counting items to a terminal device, a terminal device having a small display region cannot refer to all of the counting results without performing an operation such as scrolling. In a terminal device having a low display processing speed, it takes time to display all of counting results. In contrast, when simple counting results of a small number of counting items are transmitted to terminal devices, although the above-described problems do not occur, a problem occurs such that detailed counting results cannot be referred to, regardless of allowance in the size of the display region and a display processing speed, in the terminal device having a large display region and the terminal device having a high display processing speed.

Object of the Invention

An object of the present invention is therefore to enable the user who provides data to refer to a counting result of a process history according to the type of a terminal device used by the user himself/herself.

According to the present invention, there is provided A data use status tracking system including:

a terminal device that generates and transmits data; and
a manager device that receives said data transmitted from said terminal device,
said manager device including:
a manager-side process history storing unit;
a manager-side processing unit that processes said data received from said terminal device and registers a process history including the process details of the data in said manager-side process history storing unit; and
a manager-side referring unit that receives a process history reference request designating a part or all of said process histories registered in said manager-side process history storing unit from said terminal device and transmits, as a response, out of counting results obtained by counting said process histories designated by said process history reference request with respect to a plurality of counting items, said counting result related to said counting item according to the type of the terminal device to the terminal device.

According to the present invention, there is provided a first manager device including:

a manager-side process history storing unit;
a manager-side processing unit that processes the data received from a terminal device that generates and transmits data, and registers a process history including the process details of the data in the manager-side process history storing unit; and
a manager-side referring unit that receives a process history reference request designating a part or all of the process histories registered in the manager-side process history storing unit from the terminal device and transmits, as a response, out of counting results obtained by counting the process histories designated by the process history reference request with respect to a plurality of counting items, the counting result related to the counting item according to the type of the terminal device to the terminal device.

According to the present invention, there is provided an agent device connected so as to be able to perform communication with a manager device including;

a manager-side process history storing unit;
a manager-side processing unit that processes the data received from a terminal device that generates and transmits data and registers a process history including the process details of the data in the manager-side process history storing unit; and a manager-side referring unit that receives a process history reference request designating a part or all of the process histories registered in the manager-side process history storing unit from the terminal device and transmits, as a response, out of counting results obtained by counting the process histories designated by the received process history reference request with respect to a plurality of counting items, the counting result related to the counting item according to the type of the terminal device to the terminal device, and the agent device including:

an agent-side process history storing unit;

an agent-side processing unit that processes the data received from the manager device and registers a process history including the process details on the data in the agent-side process history storing unit; and a process history transmitting unit that transmits a part or all of the process histories registered in the agent-side process history storing unit to the manager device.

According to the present invention, there is provided a data use status tracking method including:

processing data received from a terminal device that generates and transmits the data and registering a process history including the process details of the data in a manager-side process history storing unit by a manager computer; and receiving a process history reference request designating a part or all of the process histories registered in the manager-side process history storing unit from the terminal device and transmitting, as a response, out of counting results obtained by counting the process histories designated by the received process history reference request with respect to a plurality of counting items, the counting result related to the counting item according to the type of the terminal device to the terminal device by the manager computer.

According to the present invention, there is provided a computer-readable recording medium for storing a program that makes a computer execute:

a manager-side process of processing the data received from a terminal device that generates and transmits data and registering a process history including the process details of the data in a manager-side process history storing unit; and a manager-side referring process of receiving a process history reference request designating a part or all of the process histories registered in the manager-side process history storing unit from the terminal device and transmitting, as a response, out of counting results obtained by counting the process histories designated by the process history reference request with respect to a plurality of counting items, the counting result related to the counting item according to the type of the terminal device to the terminal device.

According to the present invention, an effect such that the user who provides data can refer to a count result of a process history according to the type of a terminal device used by the user himself/herself.

BRIEF DESCRIPTION OF THE DRAWINGS

The above object and other objects and features and advantages will become more apparent from the following preferred embodiments and the following drawings accompanying the embodiments.

FIG. 5 is a diagram showing an example of data in a process history storing unit 25.

FIG. 6 is a diagram showing an example of data in a process history storing unit 35.

FIG. 7 is a diagram showing an example of data in the process history storing unit 25 after registering a process history transmitted from an agent device 3.

FIG. 8 is a diagram showing an example of a counting result by a simplified counting method.

FIG. 9 is a diagram showing an example of a counting result by a detailed counting method.

FIG. 12 is a flowchart showing a process example of a referring unit 23a.

FIG. 13 is a diagram showing an example of data in a simplified counting result storage region in a counting result storing unit 27.

FIG. 14 is a diagram showing an example of data in a detailed counting result storing region in the counting result storing unit 27.

FIG. 20 is a diagram showing an example of data in the process history storing unit 25.

FIG. 21 is a diagram showing an example of data in a data storing unit 29.

FIG. 22 is a diagram showing an example of data in the data storing unit 29 after data erasure.

FIG. 23 is a diagram showing an example of data in the process history storing unit 35.

FIG. 24 is a diagram showing an example of data in the data storing unit 37.

FIG. 25 is a diagram showing an example of data in the data storing unit 37 after data erasure.

BEST MODE FOR CARRYING OUT THE INVENTION

Next, best modes for carrying out the present invention will be described in detail with reference to the drawings.

First Embodiment of the Invention

Figure 1:
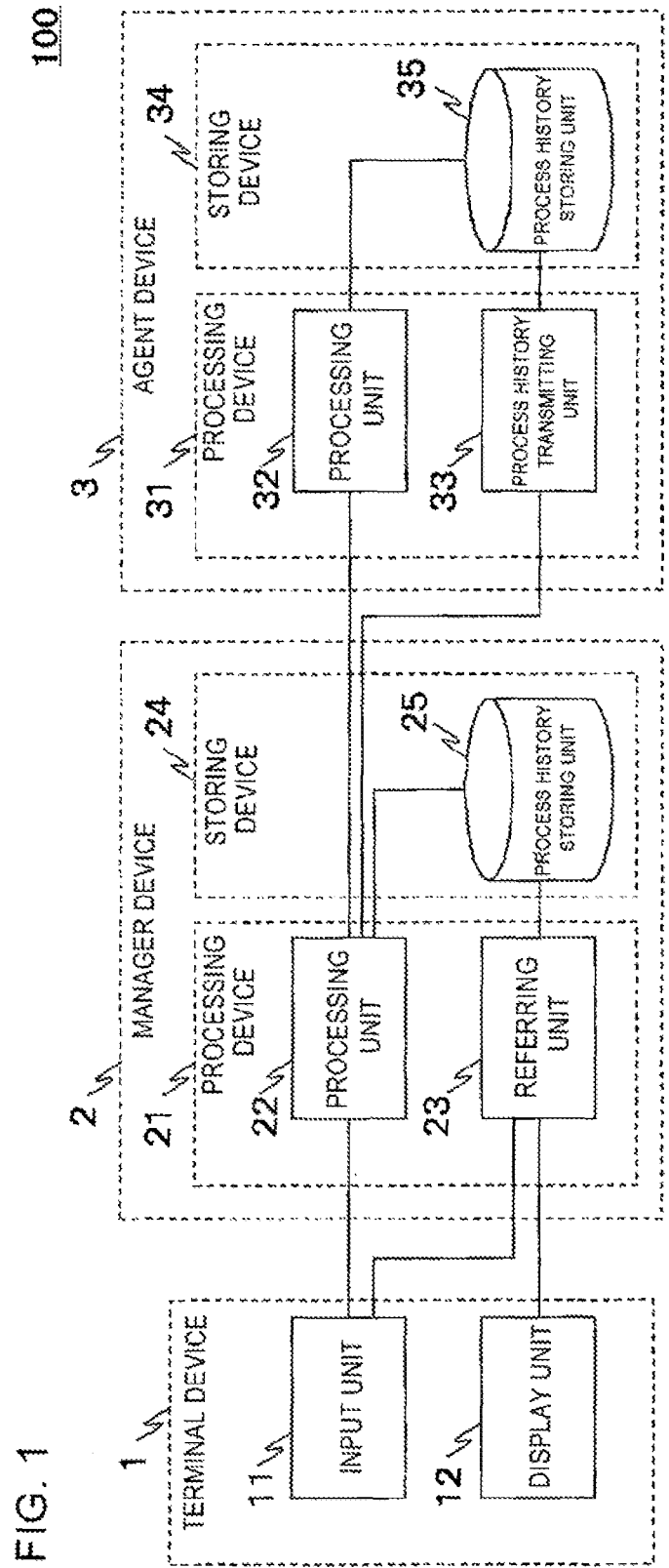
FIG. 1 is a block diagram showing a configuration example of a first embodiment of a data use status tracking system according to the present invention.

Referring to FIG. 1, a first embodiment of a data use status tracking system 100 according to the present invention includes a terminal device 1, a manager device 2, and an agent device 3 which are connected to one another via a network (not shown). Although only one agent device 3 is shown in FIG. 1, a plurality of agent devices 3 may be provided.

Configuration of Terminal Device 1

The terminal device 1 is used by the provider of data and is realized by a portable terminal such as a cellular phone or a personal computer (PC). The terminal device 1 has an input unit 11 such as a key input unit and a display unit 12 such as an LCD and has a function of transmitting data input from the input unit 11 to the manager device 2 and displaying data transmitted from the manager device 2 on the display unit 12.

Configuration of Manager Device 2

The manager device 2 is a web server that provides predetermined service to the user of the terminal device 1 and is realized by a computer. The manager device 2 includes a processing device 21 operated by a program control and a storing device 24 such as a disk device storing information.

The storing device 24 is provided with a process history storing unit 25. In the process history storing unit 25, a process history including the details of a process performed by the processing device 21 on data transmitted from the terminal device 1 and data specifying information that specifies the data is registered. The process details include the device name of a processing device performing the process, type of the process (reference, addition, storage, concealment, transmission, or the like), process date and time, and the like. The data specifying information includes data ID, type of data (personal information, position information, purchase information, and the like), and a provider ID specifying the provider of the data.

The processing device 21 has a processing unit 22 and a referring unit 23. The processing unit 22 and the referring unit 23 are realized by reading a program recorded on a disk, a semiconductor memory, or the like and executing it by the processing device 21.

The processing unit 22 performs a predetermined process on data transmitted from the terminal device 1 and has the function of registering a process history including the process details and the data specifying information into the process history storing unit 25 and the function of registering the process history transmitted from the agent device 3 into the process history storing unit 25.

The referring unit 23 receives a process history reference request transmitted from the terminal device 1. The process history reference request designates a part or all of process histories registered in the process history storing unit 25. The referring unit 23 has the function of retrieving a process history designated by the process history reference request from the process history storing unit 25 and the function of counting retrieved process histories by a counting method according to the type of the terminal device 1 and transmitting a counting result to the terminal device 1. In the embodiment, in the case where the type of the terminal device 1 is not a cellular phone, counting is performed by using the detailed counting method by which counting results on all of predetermined counting items can be obtained. In the case where the type of the terminal device 1 is a cellular phone, counting is performed by using the simplified counting method by which counting results on a part of all of the counting items can be obtained. The reason why the counting is performed in such a manner is that the size of a display region of a cellular phone is smaller than that of a display region of a terminal device of another type (for example, a personal computer), and the number of counting items which can be displayed once is small.

Configuration of Agent Device 3

The agent device 3 is a web server under the manager device 2, which provides service to the user of the terminal device 1 and is realized by a computer. The agent device 3 includes a processing device 31 operated by program control, and a storing device 34 such as a disk device that stores information.

The storing device 34 is provided with a process history storing unit 35. In the process history storing unit 35, history information is registered, which includes the details of a process performed by the processing device 31 on data transmitted from the terminal device 1 via the manager device 2, and data specifying information specifying the data.

The processing device 31 has a processing unit 32 and a process history transmitting unit 33. The processing unit 32 and the process history transmitting unit 33 are realized by reading a program recorded on a disk, a semiconductor memory, or the like and executing it by the processing device 31.

The processing unit 32 performs a predetermined process on data transmitted from the terminal device 1 via the manager device 2 and has the function of registering a process history including the process details and data specifying information that specifies the data into the process history storing unit 35.

The process history transmitting unit 33 has the function of transmitting process histories which has not been transmitted in the process histories stored in the process history storing unit 35 to the manager device 2 at predetermined timings (for example, every predetermined time).

Description of Operation of First Embodiment

Next, the operation of the embodiment will be described in detail with reference to the drawings.

Data entered with the input unit 11 by the user of the terminal device 1 in order to receive provision of service is transmitted to the manager device 2 via the network. It is assumed that the data includes privacy data, a type of the privacy data (position information, purchase information, and the like), and a provider ID given to the user.

The manager device 2 receives the data transmitted from the terminal device 1 by the processing unit 22 (step A1 in FIG. 2) and performs a predetermined process on the received data (step A2). For example, the manager device 2 performs a process of decoding (disclosing), storing, coding, transmitting, and the like of data. In step A2, the manager device 2 also performs a process of generating a data ID for specifying the received data.

After completion of the process in step A2, the processing unit 22 registers a process history including the details of the process performed on the data and data specifying information that specifies the data in the process history storing unit 25 (step A3). For example, when processes of "j" types are performed in step A2, "j" pieces of process histories are registered in the process history storing unit 25.

When it is assumed that the processing unit 22 performs a process of transmitting the data to the agent device 3 in the step A2, the processing unit 32 in the agent device 3 performs a process similar to that performed by the processing unit 22 (steps A1 to A3), and registers a process history in the process history storing unit 35.

On the other hand, the process history transmitting unit 33 in the agent device 3 waits for predetermined time (step B1 in FIG. 3), after that, retrieves process histories registered between the time just after start of waiting and the time just before the end of waiting from the process histories registered in the process history storing unit 35 (step B2), and transmits the retrieved process histories to the manager device 2 (step B3). After that, the process history transmitting unit 33 again enters a waiting state for predetermined time (step B1).

The manager device 2 receives the process histories transmitted from the agent device 3 by the processing unit 22, and the processing unit 22 registers the received process histories in the process history storing unit 25.

By the above processes, the process histories of the processes performed by the manager device 2 and the agent device 3 on the data provided by the user of the terminal device 1 are registered in the process history storing unit 25 in the manager device 2.

In the case where the user of the terminal device 1 (the provider who has provided data to the manager device 2) wishes to check a use state of the data provided by himself/herself, the user enters a process history reference request from the input unit 11. The process history reference request includes terminal type information indicative of whether the terminal device 1 is a portable terminal and the provider ID. The terminal device 1 whose user transmits the process history reference request does not have to be the same terminal device used at the time of transmitting data.

Figure 4:
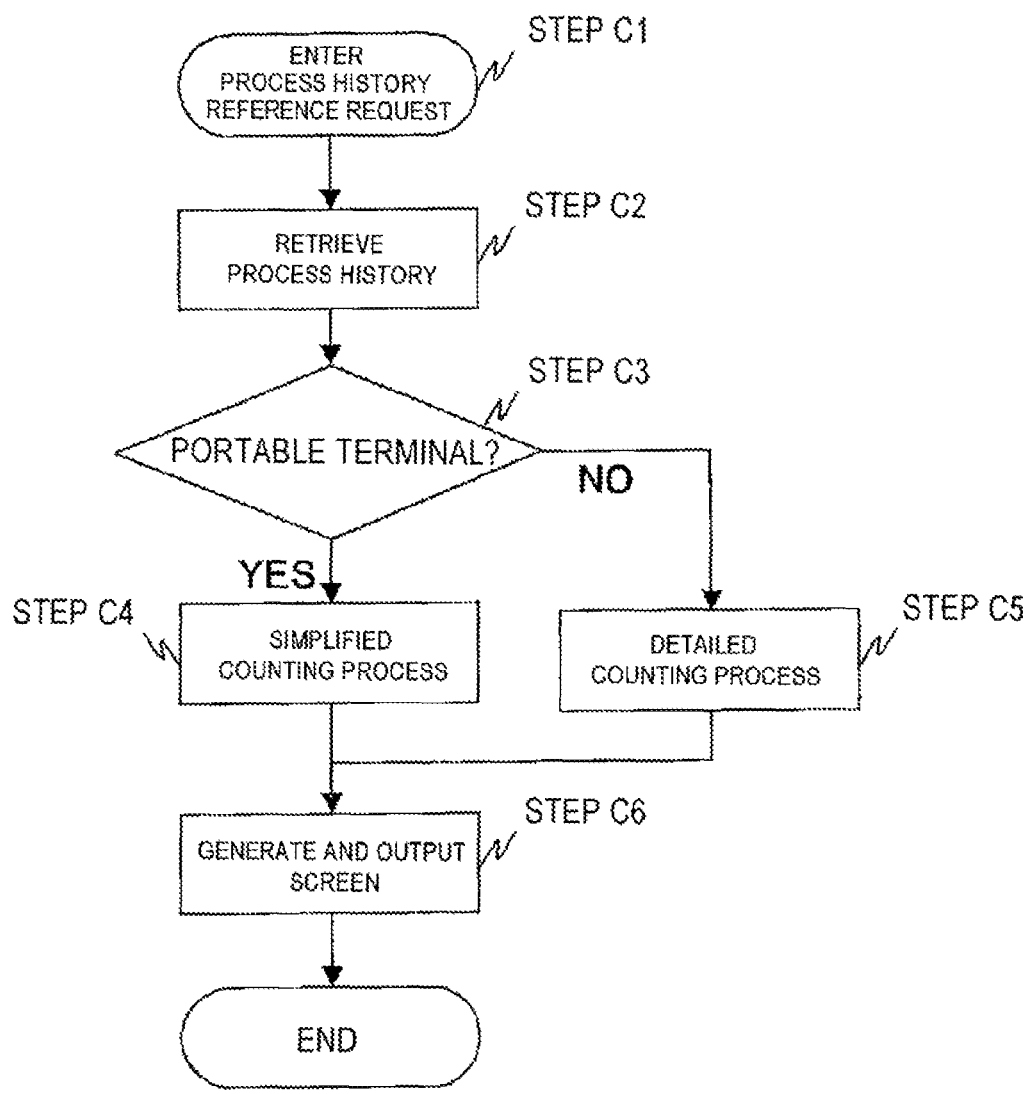
FIG. 4 is a flowchart showing a process example of a referring unit 23.

The manager device 2 receives the process history reference request transmitted from the terminal device 1 by the referring unit 23 (step C1 in FIG. 4). The referring unit 23 searches the process history storing unit 25 using, as a key, the provider ID in the received process history reference request to obtain a process history regarding the data provided by the user of the terminal device 1 (step C2).

After that, the referring unit 23 determines whether the terminal device 1 as a requester is a portable terminal whose display unit 12 is relatively small or a terminal of another type such as a PC whose display unit 12 is relatively large (step C3).

In the case where the terminal device 1 is determined as a portable terminal, the process histories retrieved in step C2 are counted by the simplified counting method by which a simple counting result with the small number of counting items can be obtained (to the degree that the counting items can be displayed in the display unit 12 at one time) (YES in step C3 and C4). As the simplified counting method, various methods may be employed. For example, a counting method for counting the number of times a process of a specific process type is performed in a processing device in a past predetermined period may be employed. The simplified counting method is not limited to the above but other counting methods may be employed as long as a counting result which can be displayed at one time in a display unit of a portable terminal is obtained.

On the other hand, in the case where it is determined that the terminal device 1 is not a portable terminal, the process histories retrieved in step C2 are counted by the detailed counting method by which a detailed counting result with the large number of counting items can be obtained (NO in steps C3 and C5). As the detailed counting method, various methods may be employed. For example, a counting method for counting the number of times each of processes of all of process types is performed in each of processing devices in a past predetermined period may be employed. The detailed counting method is not limited to the above but other counting methods may be employed as long as a detailed counting result of larger number of counting items than that of the simplified counting method may be obtained.

After that, the referring unit 23 generates a screen for displaying a counting result of the counting performed in step C4 or step C5, and transmits the generated screen to the terminal device 1 as the requester (step C6).

The process history reference request may further include an item other than the provider ID as a search condition. For example, the type of data, a period, and the like may be included.

Concrete Example of Operation of First Embodiment

Next, the operation of the embodiment will be described by a concrete example. It is now assumed that the following ciphered (secrete) three pieces of data D1, D2, and D3 are sequentially transmitted from the terminal device 1 to the manager device 2.

Data D1 including privacy data "area 1", type of privacy data "position information", and provider ID "provider A"

Data D2 including privacy data "area 2", type of privacy data "position information", and provider ID "provider A"

Data D3 including privacy data "area 3", type of privacy data "position information", and provider ID "provider A"

The position information such as the areas 1 and 2 may be information entered actively by the user using the input unit 11 or a result of measurement by a GPS or the like.

Figure 2:
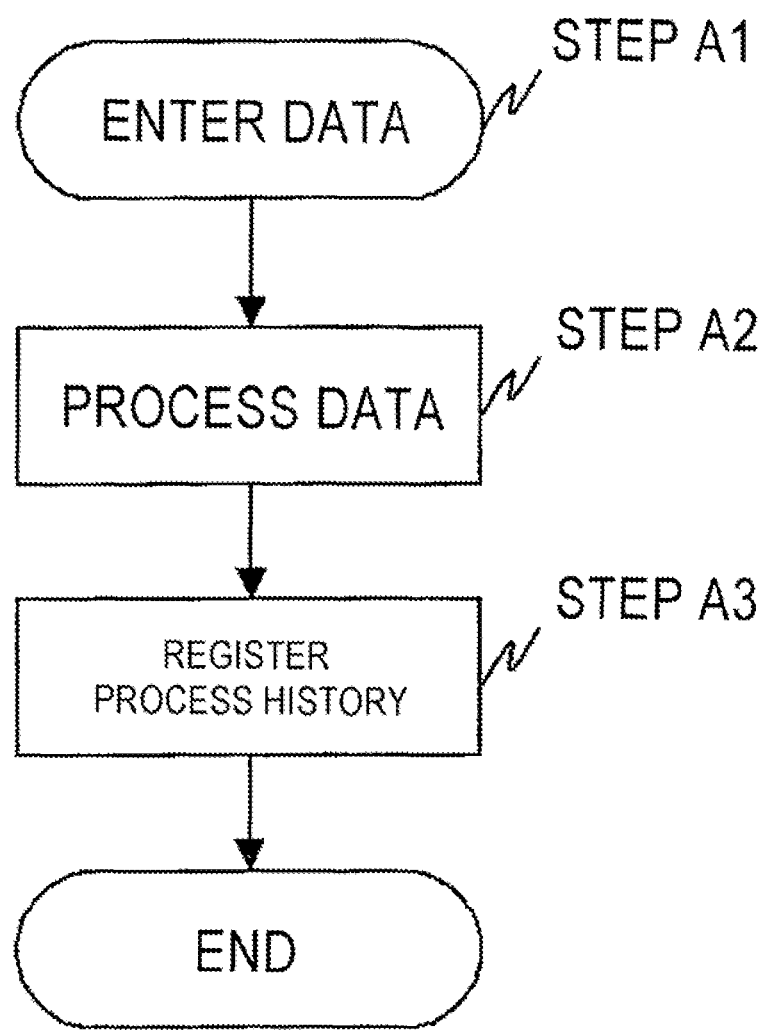
FIG. 2 is a flowchart showing a process example of a processing unit 22.

The processing unit 22 in the manager device 2 performs the processes shown in the flowchart of FIG. 2 on each of the pieces of the data D1 to D3 transmitted from the terminal device 1. When the data D1 is received (step A1 in FIG. 2), the processing unit 27 performs a predetermined process on the data D1 (step A2). In the concrete example, the processing unit 22 performs decoding (disclosure) on the data D1, stores the decoded data in a database (not shown), further, encodes the decoded data again, and transmits the resultant data to the agent device 3. After that, the processing unit 22 registers a process history on the data D1 in the process history storing unit 25 (step A3). The processing unit 22 performs similar processes on also the data D2 and D3. FIG. 5 shows an example of the process histories on the pieces of the data D1 to D3, registered in the process history storing unit 25. In the concrete example, the process history includes, as data specifying information, data ID, a type of data, and a provider ID and, as the details of a process, a type of process, a name of a processing device which executes the process, and process date and time.

On the other hand, the processing unit 32 in the agent device 3 performs the processes shown in the flowchart of FIG. 2 on each of the pieces of the data D1 to D3 transmitted from the manager device 2. When the data D1 is received, the processing unit 32 decodes it (steps A1 and A2 in FIG. 2). After that, the processing unit 32 registers a process history on the data D1 in the process history storing unit (step A3). The processing unit 32 performs similar processes on also the data D2 and D3. FIG. 6 shows an example of the process histories on the pieces of the data D1 to D3, registered in the process history storing unit 35.

Figure 3:
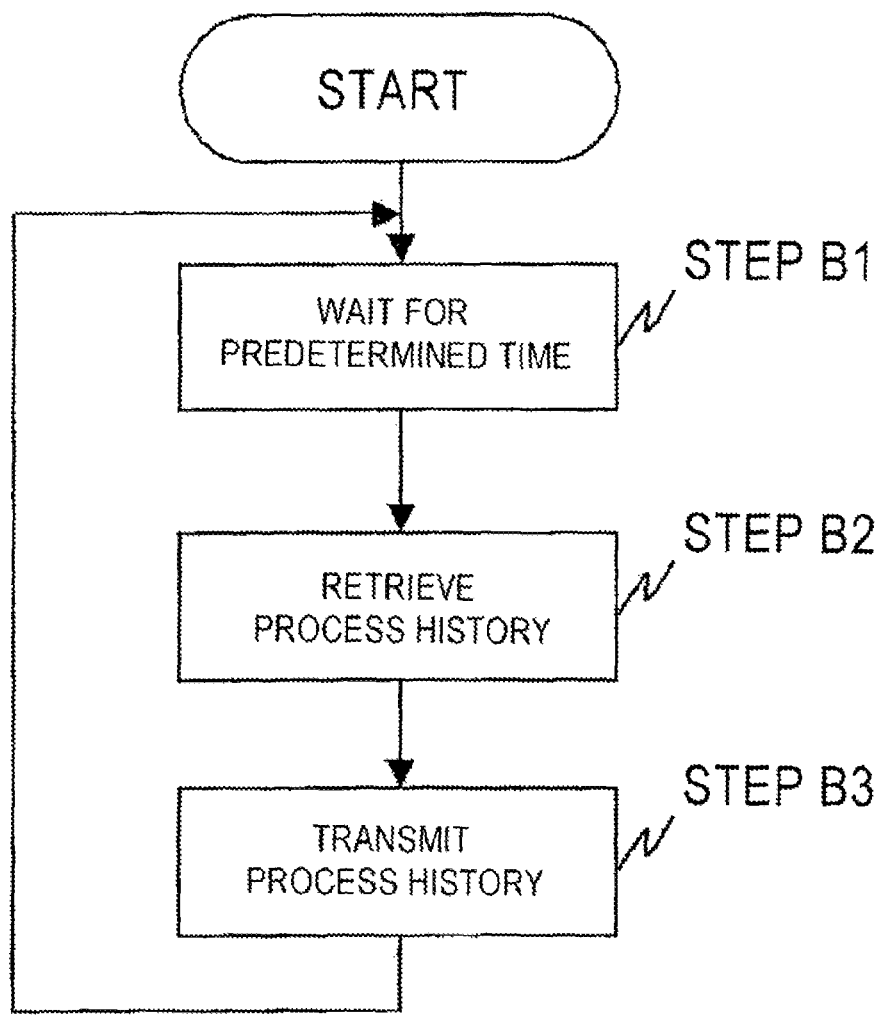
FIG. 3 is a flowchart showing a process example of a process history transmitting unit 33.

The process history transmitting unit 33 in the agent device 3 retrieves a process history which has not been transmitted from the process history storing unit 35 and transmits it to the manager device 2 every predetermined time (steps B1 to B3 in FIG. 3).

The processing unit 22 in the manager device 2 registers process histories on the pieces of the data D1 to D3 transmitted from the agent device 3 into the process history storing unit 25. As a result, the data in the process history storing unit 25 is as shown in FIG. 7. In FIG. 7, process histories registered in a region 71 relate to processes performed by the manager device 2, and process histories registered in a region 72 relate to processes performed by the agent device 3.

In the case where the user wishes to check a use state of the pieces of the data D1 to D3 provided by himself/herself, the user enters the process history reference request from the input unit 11. The request includes the provider ID "provider A" and terminal type information (a portable terminal in the concrete example).

When the process history reference request from the terminal device 1 is received, the referring unit 23 in the manager device 2 searches the process history storing unit 25 using the provider ID "provider A" included in the request as a key (steps C1 and C2 in FIG. 4). In the case of the example, process histories registered in the regions 71 and 72 in FIG. 7 are retrieved.

After that, the referring unit 23 counts the process histories retrieved in step C2 by using the simplified counting method because the terminal type information in the process history reference request indicates a portable terminal (YES in steps C3 and C4), generates a screen for displaying a result of the counting, and transmits the screen to the terminal device 1 (step C6). Assuming now that the simplified counting method is used to count the number of times the process of process type "disclosure" was performed in a processing device in the past one month, a screen as shown in FIG. 8 including accounting result on two counting items is generated and transmitted to the terminal device 1. In the terminal device 1, the screen showing the counting result transmitted from the manager device 2 is displayed in the display unit 12.

In the case where the terminal type information in the process history reference request does not indicate a portable terminal, the process histories retrieved in step C2 are counted by the detailed counting method (NO in steps C3 and C5), the display screen of the counting result is generated and transmitted to the terminal device 1. Assuming now that the detailed counting method is used to count the number of times each of processes by all of the process types was performed in each of processing devices in the past one month, a screen as shown in FIG. 9 including a counting result on six counting items is generated and transmitted the terminal device 1.

Effect of First Embodiment

According to the embodiment, an effect such that the user who has provided data can refer to a counting result of process histories according to the type of the terminal device 1 used by the user himself/herself can be obtained. The reason is because the counting result having counting items of the number according to the type of the terminal device 1 is transmitted to the terminal device 1.

According to the embodiment, an effect such that only by using a terminal device of a different type, a counting result according to the type of the terminal device can be referred to can be obtained. For example, in the case where the user who has referred to a simplified counting result by using a portable terminal on the outside of home wishes to refer to a detailed counting result as well, only by transmitting a process history reference request from a personal computer at home or the like (without necessity to perform a troublesome operation such as an operation of designating a counting item), the user can refer to a detailed counting result.

Second Embodiment of the Invention

Next, a second embodiment of the data use status tracking system 100 according to the present invention will be described. The embodiment is characterized in that a counting result to be returned to the terminal device is created in advance in the manager device in order to shorten time of a response to the process history reference request from the terminal device.

Description of Configuration of Second Embodiment

Figure 10:
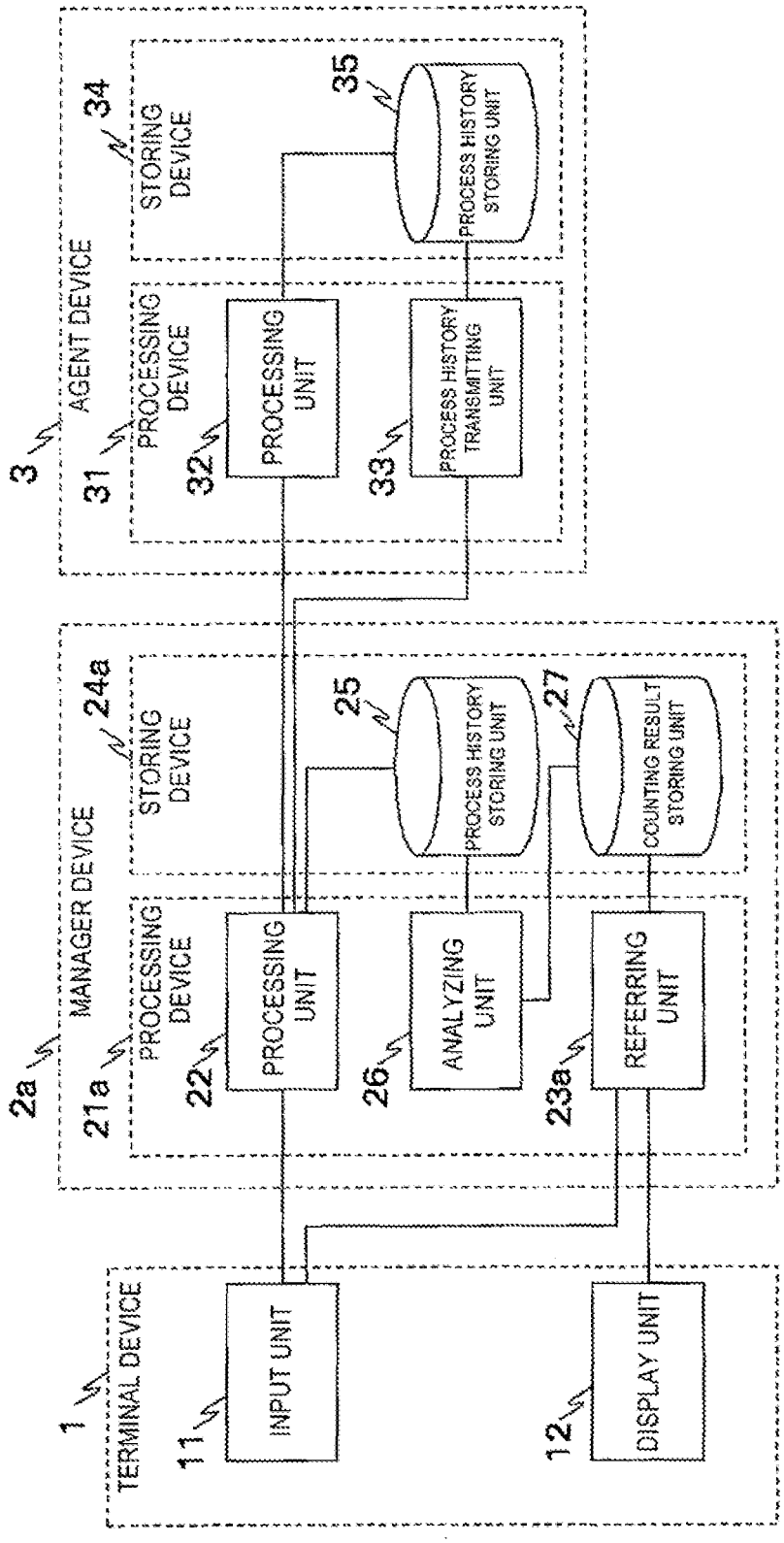
FIG. 10 is a block diagram showing a configuration example of a second embodiment of a data use status tracking system according to the present invention.

Referring to FIG. 10, the data use status tracking system 100 of the embodiment is different from that of the first embodiment shown in FIG. 1 in that a manager device 2a is provided in place of the manager device 2.

The manager device 2a is different from the manager device 2 shown in FIG. 1 in that a processing device 21a and a storing device 24a are provided in place of the processing device 21 and the storing device 24, respectively.

The storing device 24a is different from the storing device 24 shown in FIG. 1 in that a counting result storing unit 27 is provided. The counting result storing unit 27 is divided into a simplified counting result storing region and a detailed counting result storing region.

The processing device 21a is different from the processing device 21 shown in FIG. 1 in that a referring unit 23a is provided in place of the referring unit 23, and in that an analyzing unit 26 is added. The processing unit 22, the referring unit 23a, and the analyzing unit 26 are realized when the processing device 21a reads a program recorded on a recording medium such as a semiconductor memory and executes it.

The analyzing unit 26 has the following functions:

a function of dividing target process histories registered during a predetermined past period T (T>t) from the present time, in process histories registered in the process history storing unit 25 into groups by provider Ids;

a function of counting process histories belonging to each of the groups by using two counting methods of the simplified counting method and the detailed counting method. The simplified counting method is a counting method for portable terminals. A counting method for counting the number of times a process of a specific process type is executed in each of processing devices may be employed;

the detailed counting method is a counting method for terminal devices other than portable terminals. A counting method for counting the number of times each of processes of all process types is executed in each of processing devices may be employed. Therefore, a counting result obtained by the simplified counting method includes a part of counting items in a counting result obtained by the detailed counting method. A counting result includes a provider ID for indicating the provider of the counting result;

a function of checking, for each of simplified counting results, whether a simplified counting result including the same provider ID is already registered in the simplified counting result storing region in the counting result storing unit 27, if it is registered, replacing the registered result with the simplified counting result of this time and, if it is not registered, additionally registering the simplified counting result of this time;

a function of checking, for each of detailed counting results, whether a detailed counting result including the same provider ID is already registered in the detailed counting result storing region in the counting result storing unit 27, if it is registered, replacing the registered result with the detailed counting result of this time and, if it is not registered, additionally registering the detailed counting result of this time.

The referring unit 233 has a function of, when a process history reference request is transmitted from the terminal device 1, retrieving a corresponding counting result from the counting result storing unit 27 and responding to the terminal device 1 as a requester.

Description of Operation of Second Embodiment

Next, the operation of the embodiment will be described. Only points different from the first embodiment will be described here.

Figure 11:
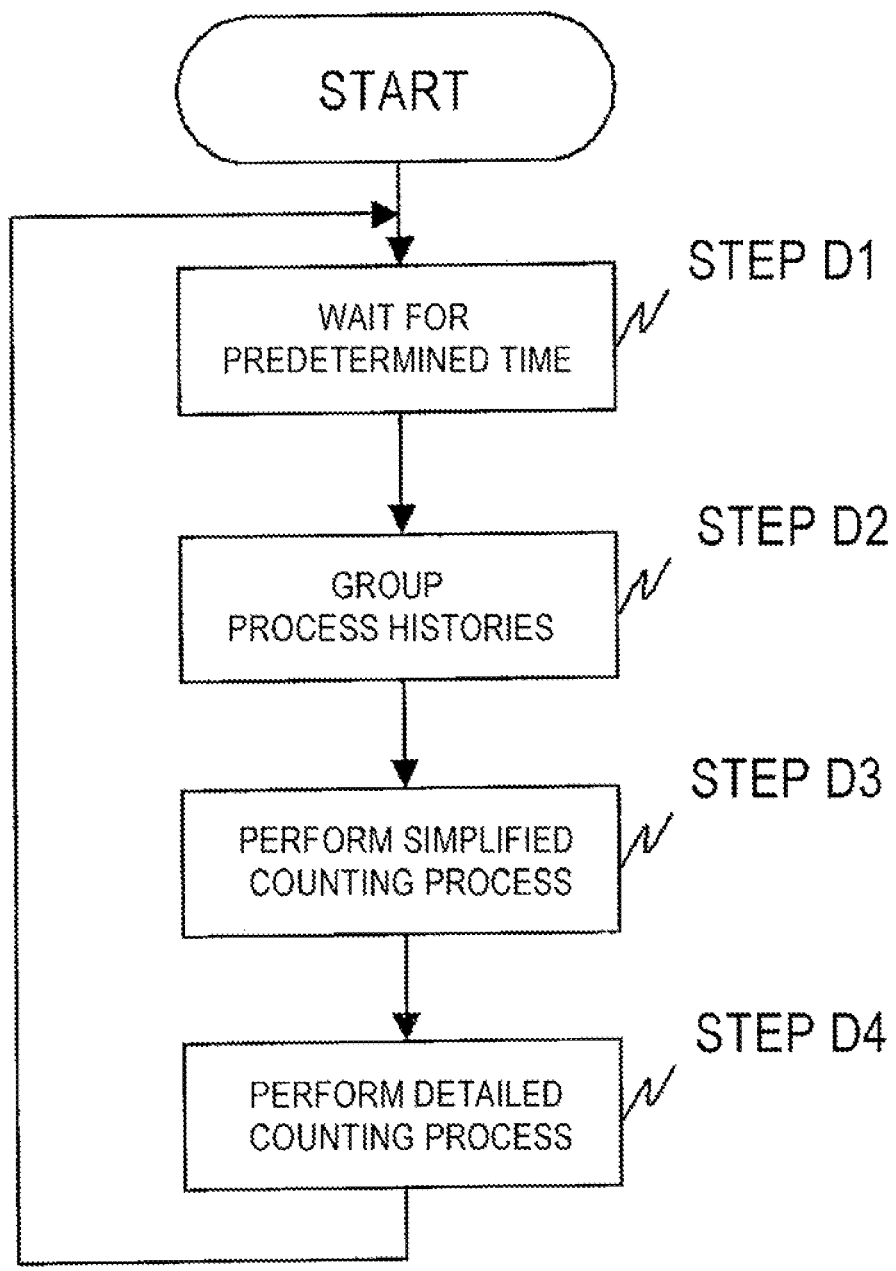
FIG. 11 is a flowchart showing a process example of an analyzing unit 26.

As shown in the flowchart of FIG. 11, the analyzing unit 26 in the manger device 2a waits only for predetermined time "t" (step D1) and, after that, divides target process histories registered during a predetermined past period T (T>t) from the present time, in process histories registered in the process history storing unit 25 into groups by provider IDs (step D2).

After that, the analyzing unit 26 performs the simplified counting process on process histories belonging to each of the groups on the group unit basis (step D3). More concretely, the analyzing unit 26 counts process histories belonging to a group to be processed by using the simplified counting method and obtains a simplified counting result. After that, the analyzing unit 26 checks whether a simplified counting result including the same provider ID as that of the obtained simplified counting result is registered in the simplified counting result storing region in the counting region storing unit 27. If it is registered, the analyzing unit 26 replaces the registered simplified counting result with the simplified counting result of this time and, if it is not registered, additionally registers the simplified counting result of this time.

After that, the analyzing unit 26 performs the detailed counting process on process histories belonging to each of the groups on the group unit basis (step D4). More concretely, the analyzing unit 26 counts process histories belonging to a group to be processed by using the detailed counting method and obtains a detailed counting result. After that, the analyzing unit 26 checks whether a detailed counting result including the same provider ID as that of the obtained detailed counting result is registered in the detailed counting result storing region in the counting region storing unit 27. If it is registered, the analyzing unit 26 replaces the registered detailed counting result with the detailed counting result of this time and, if it is not registered, additionally registers the detailed counting result of this time.

By the above process, the simplified counting results and the detailed counting results in the past predetermined period "T" of each of the providers are registered in the counting result storing unit 27.

On receipt of a process history reference request from the terminal device 1, the referring unit 23a determines whether a terminal device as a requester is a portable terminal based on terminal type information included in the request (step E2). The referring unit 23 of the first embodiment searches the process history storing unit 25 on receipt of the process history reference request, and performs the counting process on a retrieved process history. In contrast, the referring unit 23a of the embodiment does not perform the process of searching the process history storing unit 25 and the counting process.

In the case where it is determined that the terminal device 1 as the requester is a portable terminal (YES in step E2), the referring unit 23a retrieves a simplified counting result including the same provider ID as that in the process history reference request from the simplified counting result storing region in the counting result storing unit 27 (step E3), generates a screen for displaying the retrieved simplified counting result, and transmits it to the terminal device 1 (step E5).

On the other hand, in the case where it is determined that the terminal device 1 as the requester is not a portable terminal device (NO in step E2), the referring unit 23a retrieves a detailed counting result including the same provider ID as that in the process history reference request from the detailed counting result storing region in the counting result storing unit 27 (step E4), generates a screen for displaying the retrieved detailed counting result, and transmits it to the terminal device 1 (step E5).

Concrete Example of Operation of Second Embodiment

First, using the case where the data in the process history storing unit 25 is that shown in FIG. 7 as an example, the operation of the analyzing unit 26 will be described. The analyzing unit 26 waits for the predetermined time "t" (step D1 in FIG. 11) and, after that, divides target process histories registered during a predetermined past period T (T>t) from present time, in process histories registered in the process history storing unit 25 into groups by provider IDs (step D2). In the case of the example, all of provider IDs of the process histories registered in the regions 71 and 72 are "provider A", so that the process histories are set in one group.

After that, the analyzing unit 26 performs the simplified counting process on process histories belonging to the group of the provider A (step D3). By the process, a simplified counting result 131 shown in FIG. 13 is additionally registered or overwritten in the simplified counting result storing region in the counting result storing unit 27.

After that, the analyzing unit 26 performs the detailed counting process on the process histories as targets belonging to the group of the provider A (step D4). By the process, the detailed counting result 141 shown in FIG. 14 is additionally registered or overwritten in the detailed counting result storing region in the counting result storing unit 27.

Figure 12:
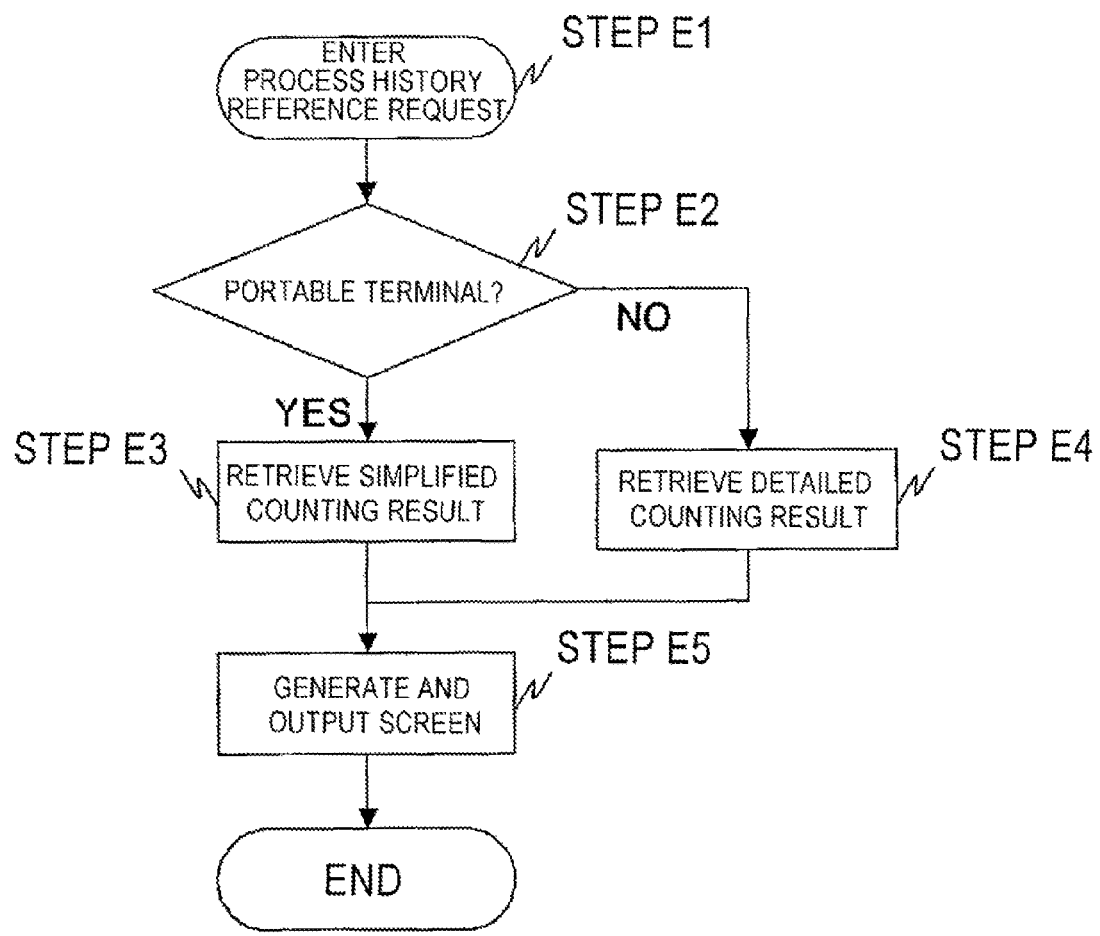

When the data in the simplified counting result storing region and the detailed counting result storing region in the counting result storing unit 27 are data as shown in FIGS. 13 and 14, respectively, and the process history reference request is transmitted from the terminal device 1, in the case where the terminal device 1 is a portable terminal (YES in step E2 in FIG. 12), the simplified counting result storage region in the counting result storing unit 27 is searched using the provider ID in the process history reference request as a key, and a screen for displaying the retrieved simplified counting result (for example, the screen shown in FIG. 8) is generated and transmitted to the terminal device 1 (step E5). On the other hand, in the case where the terminal device 1 is not a portable terminal (NO in step E2), the detailed counting result storage region is searched using the provider ID as a key, and a screen for displaying the retrieved detailed counting result (for example, the screen shown in FIG. 9) is generated and transmitted to the terminal device 1 (step E5).

Effect of Second Embodiment

According to the embodiment, an effect such that the response time to the process history reference request from the terminal device 1 can be shortened can be obtained. The reason is that a counting result of a process history to be returned to the terminal device 1 is created in advance.

Third Embodiment of the Invention

Next, a third embodiment of the present invention will be described. The embodiment is characterized in that, to prevent tightness in a storing region in the manager device and increase in load on the manager device, process histories are stored dispersedly in the manager device and agent devices, and the retrieving process and the counting process on process histories are performed dispersedly by the manager device and the agent devices.

Figure 15:
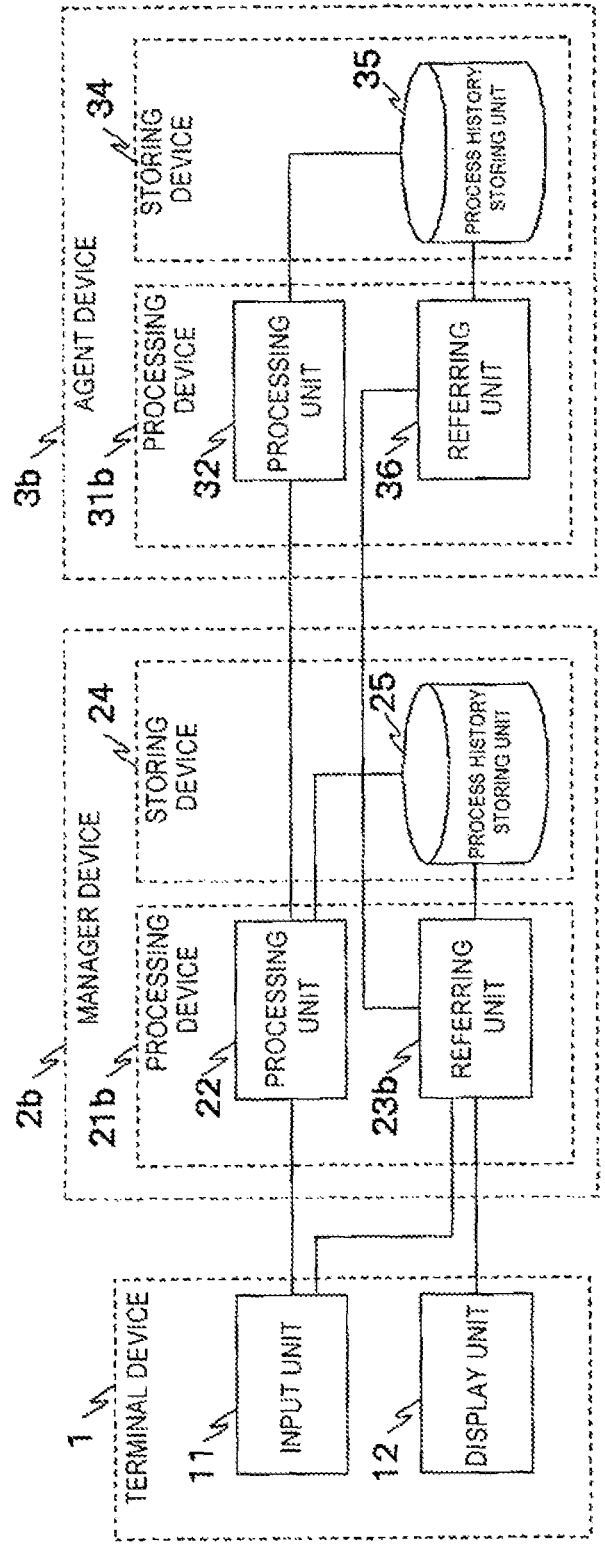
FIG. 15 is a block diagram showing a configuration example of a third embodiment of a data use status tracking system according to the present invention.

Referring to FIG. 15, the data use status tracking system 100 of the embodiment is different from that of the first embodiment shown in FIG. 1 in that a manager device 2*b* and an agent device 3*b* are provided in place of the manager device 2 and the agent device 3, respectively.

The manager device 2*a* is different from the manager device 2 of the first embodiment in that a processing device 21*b* is provided in place of the processing device 21, and the agent device 3*b* is different from the agent device 3 in the first embodiment in that a processing device 31*b* is provided in place of the processing device 31.

The processing device 21*b* in the manager device 2*b* is different from the processing device 21 of the first embodiment in that a referring unit 23*b* is provided in place of the referring unit 23.

The referring unit 23*b* has the following functions;

a function of receiving the process history reference request transmitted from the terminal device 1 and retrieving from the process history storing unit 25 a process history related to data designated by the request;

a function of counting the retrieved process histories by a counting method according to the type of the terminal device 1 (the simplified counting method or the detailed counting method described in the first embodiment);

a function of obtaining an agent device as a transmission destination (transfer destination) of data designated by the process history reference request with reference to the process history storing unit 25 and transmitting the process history reference request to the agent device;

a function of integrating a counting result of the counting performed by the unit itself and a counting result transmitted from the agent device, and transmitting the resultant as a response to the terminal device 1 as the requester.

The processing device 31*b* in the agent device 3*b* is different from the processing device 31 in the first embodiment in that a referring unit 36 is provided in place of the process history transmitting unit 33.

The referring unit 36 has a function of retrieving process histories related to data designated by the process history reference request transmitted from the manager device 2*b* or another agent device from the process history storing unit 35, counting the retrieved process histories by a counting method according to the type of the terminal device 1 (the simplified counting method or the detailed counting method described in the first embodiment), and transmitting the counting result as a response to the terminal device 1. Further, the referring unit 36 also has a function of, when data designated by a process history reference request is transmitted to another agent device, transmitting the process history reference request to the another agent device.

Description of Operation of Third Embodiment

Next, the operation of the embodiment will be described. Only points different from the first embodiment will be described here.

Figure 16:
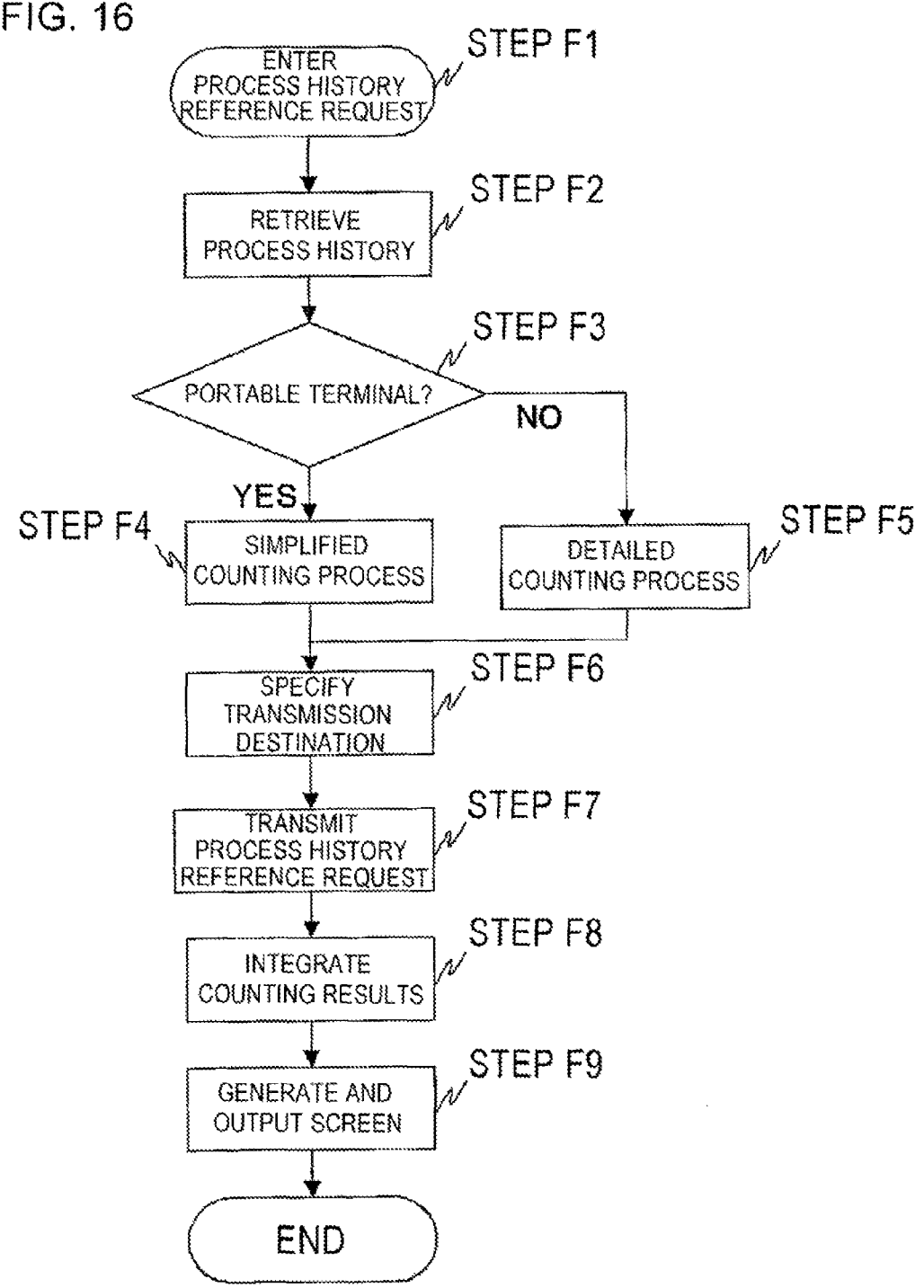
FIG. 16 is a flowchart showing a process example of a referring unit 23b.

When a process history reference request is transmitted from the terminal device 1, the referring unit 23*b* in the manager device 2*b* performs processes similar to those in steps C1 to C5 in FIG. 4 and obtains a counting result according to the type of the terminal device 1 as a requester (steps F1 to F5 in FIG. 16). After that, the referring unit 23*b* refers to the process history storing unit 25, specifies the agent device as the transmission destination of data specified by the provider ID in the process history reference request, and transmits the process history reference request transmitted from the terminal device 1 to the agent device (steps F6 and F7). In the case where the transmission destination of the data cannot be specified in step F6, step F7 is skipped.

It is now assumed that, for example, the referring unit 23*b* transmits the process history reference request to the agent device 3*b*. The referring unit 36 in the agent device 3*b* performs processes similar to those in steps F1 to F7 in FIG. 16 and, after that, transmits a counting result to the manager device 2*b*.

When the counting result is transmitted from the agent device 3*b*, the referring unit 23*b* in the manager device 2*b* integrates the counting result and the counting result in step F4 or F5 (step F8). After that, the referring unit 23*b* generates a screen for displaying the integrated counting result, and transmits it to the terminal device 1 as a requester (step F9).

Concrete Example of Operation of Third Embodiment

Next, the operation of the embodiment will be described by a concrete example. Assuming now that, for example, like the concrete example of the first embodiment, the pieces of data D1 to D3 is sequentially transmitted from the terminal device 1 to the manager device 2*b*, and "disclosure", "storage", "concealment", and "transmission of data to the agent device 3*b*" are performed on the pieces of the data D1 to D3 by the processing unit 22 in the manager device 2*b*. By performing such processes, the data in the process history storing unit 25 in the manager device 2*b* becomes like the data shown in FIG. 5. As understood from FIG. 5, the transmission destination of data is included in process histories of the process type "transmission (AGT1)". In the concrete example, it is assumed that the name of the processing device in the agent device 3*b* is "AGT1".

On the other hand, when the pieces of the data D1 to D3 is transmitted from the manager device 2*b*, the processing unit 32 in the agent device 3*b* performs predetermined processes (reception and disclosure) on the data, and registers process histories in the process history storing unit 35. As a result, the data in the process history storing unit 35 becomes data as shown in FIG. 6.

It is assumed that, after that, the user of the terminal device 1 transmits the process history reference request including the provider ID "provider A" to the manager device 2*b*. The referring unit 23*b* in the manager device 2*b* searches the process history storing unit 25 using the provider ID "provider A" as a key to obtain the corresponding process histories. In the case where the terminal device 1 is a portable terminal, the simplified counting process is performed. In the other case, the detailed counting process is performed (steps F1 to F5 in FIG. 16). It is now assumed that, for example, the terminal device 1 is a portable terminal, and a simplified counting result including the provider ID "provider A", the type "position information", the process device "MGR", the period "2008/2", and the number of times (the number of times of the disclosure process) "3" is obtained as a counting result.

After that, the referring unit 23*b* refers to the process history storing unit 25 and, based on a process history in which the process type is "transmission (AGT1)", specifies that the name of the processing device as the transmission destination of the data is "AGT1" (step F6 in FIG. 16).

Subsequently, the referring unit 23*b* transmits the process history reference request transmitted from the terminal device 1 to the agent device 3b as the transmission destination of data (step F7). In response to the request, the referring unit 36 in the agent device 3b performs the simplified counting process on process histories having the provider ID "provider A" and registered in the process history storing unit 35. It is assumed that, for example, a simplified counting result including the provider ID "provider A", type "position information", process device "MGR", period "2008/2", and the number of times (the number of times of the disclosure process) "3" is obtained. After that, the referring unit 36 in the manager device 3b performs a process of specifying the transmission destination of data (step F6). However, no process history related to the "provider A", in which the process type is "transmission" is registered in the process history storing unit 35. Consequently, it is known that the data of the "provider A" is not transmitted to another agent device, and the simplified counting result is transmitted to the manager device 2b.

The referring unit 23b in the manager device 2b integrates the simplified counting result in step F4 and the simplified counting result transmitted from the agent device 3b, generates a screen for displaying an integration result as shown in FIG. 8, and transmits the screen to the terminal device 1 as the requester (steps F8 and F9).

Effect of Third Embodiment

According to the embodiment, the data amount of the process histories registered in the process history storing unit 25 in the manager device 2b can be reduced, and the effect of reducing the load on the manager device 2b can be obtained. The reason is that process histories can be dispersedly stored in the manager device 2b and the agent devices 3b, and the counting process on process histories can be dispersedly performed by the manager device 2b and the agent devices 3b.

Fourth Embodiment of the Invention

Next, a fourth embodiment of the present invention will be described. The embodiment is characterized in that a data storage position and a data transfer destination are managed so that the provider of data himself/herself can erase or change data provided for a manager device and data transferred to an agent device.

Figure 17:
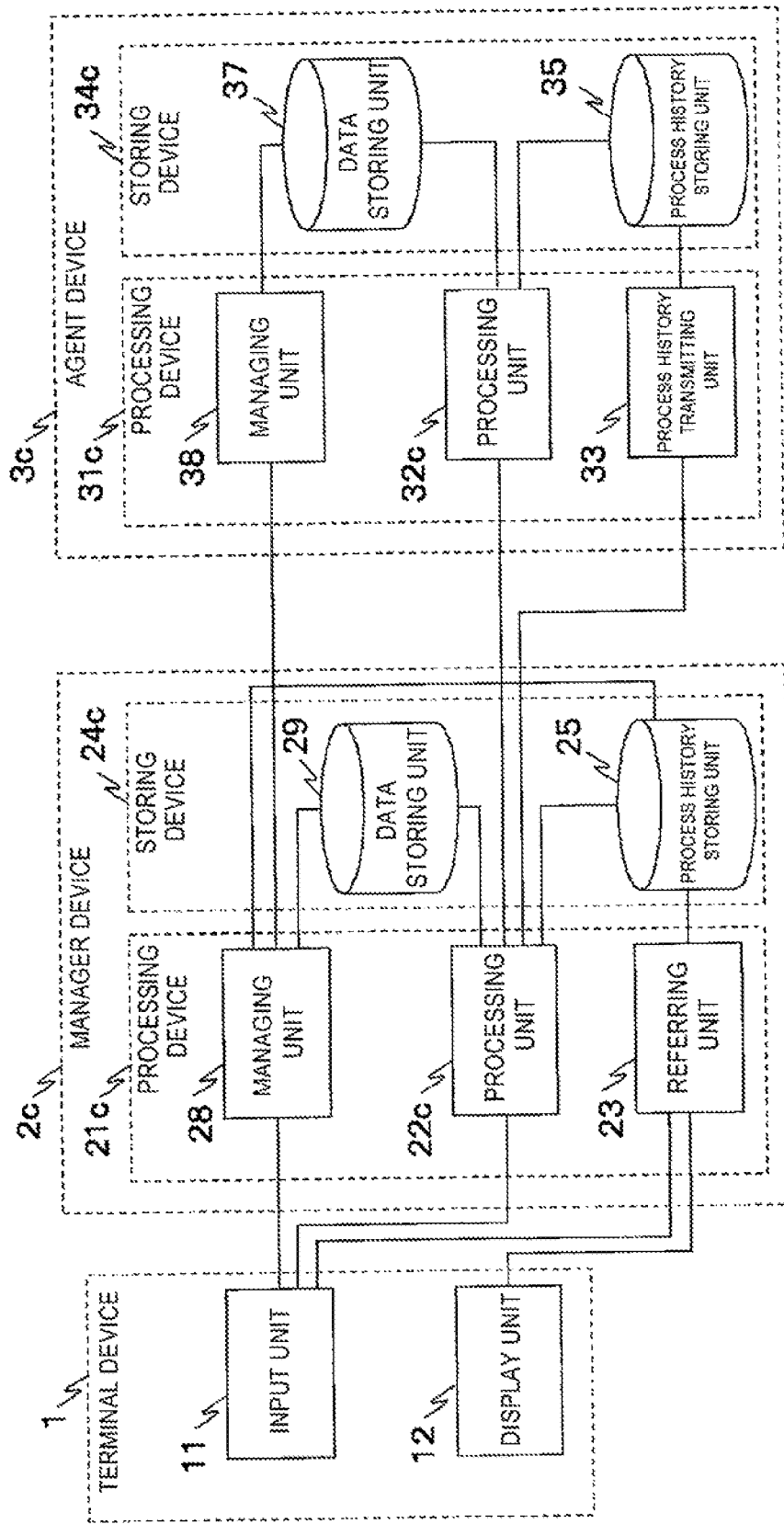
FIG. 17 is a block diagram showing a configuration example of a fourth embodiment of a data use status tracking system according to the present invention.

Referring to FIG. 17, the data use status tracking system 100 of the embodiment is different from that of the first embodiment shown in FIG. 1 in that a manager device 2c and an agent device 3c are provided in place of the manager device 2 and the agent device 3, respectively.

The manager device 2c is different from the manager device 2 of the first embodiment in that a processing device 21c and a storing device 24c are provided in place of the processing device 21 and the storing device 24, respectively.

The processing device 21c is different from the processing device 21 of the first embodiment in that a processing unit 22c is provided in place of the processing unit 22 and in that a managing unit 28 is added.

The processing unit 22c is different from the processing device 22 in that, in the case of performing a data storing process, a process history including information of the storage location of the data is registered in the process history storing unit 25 and the point that data is stored in a data storing unit 29.

The managing unit 28 has a function of receiving a data change/erase request from the terminal device 1 and changing/erasing data designated by the request. Further, it has a function of specifying a transmission destination of the data with reference to the process history storing unit 25 and transmitting the data change/erase request to the transmission destination.

To the storing device 24c, the data storing unit 29 used for storing data by the processor unit 22c is added.

The agent device 3c is different from the agent device 3 in the first embodiment in that a processing device 31c and a storing device 34c are provided in place of the processing device 31 and the storing device 34, respectively.

The processing device 31c is different from the processing device 31 in the first embodiment in that a managing unit 38 is added and a processing unit 32c is provided in place of the processing unit 32. The managing unit 38 and the processing unit 32c have functions similar to those of the managing unit 28 and the processing unit 22c, respectively.

To the storing device 34c, a data storing unit 37 used by the processing unit 32c to store data is added.

Description of Operation of Fourth Embodiment

Next, the operation of the embodiment will be described. Only points different from the first embodiment will be described here.

Figure 18:
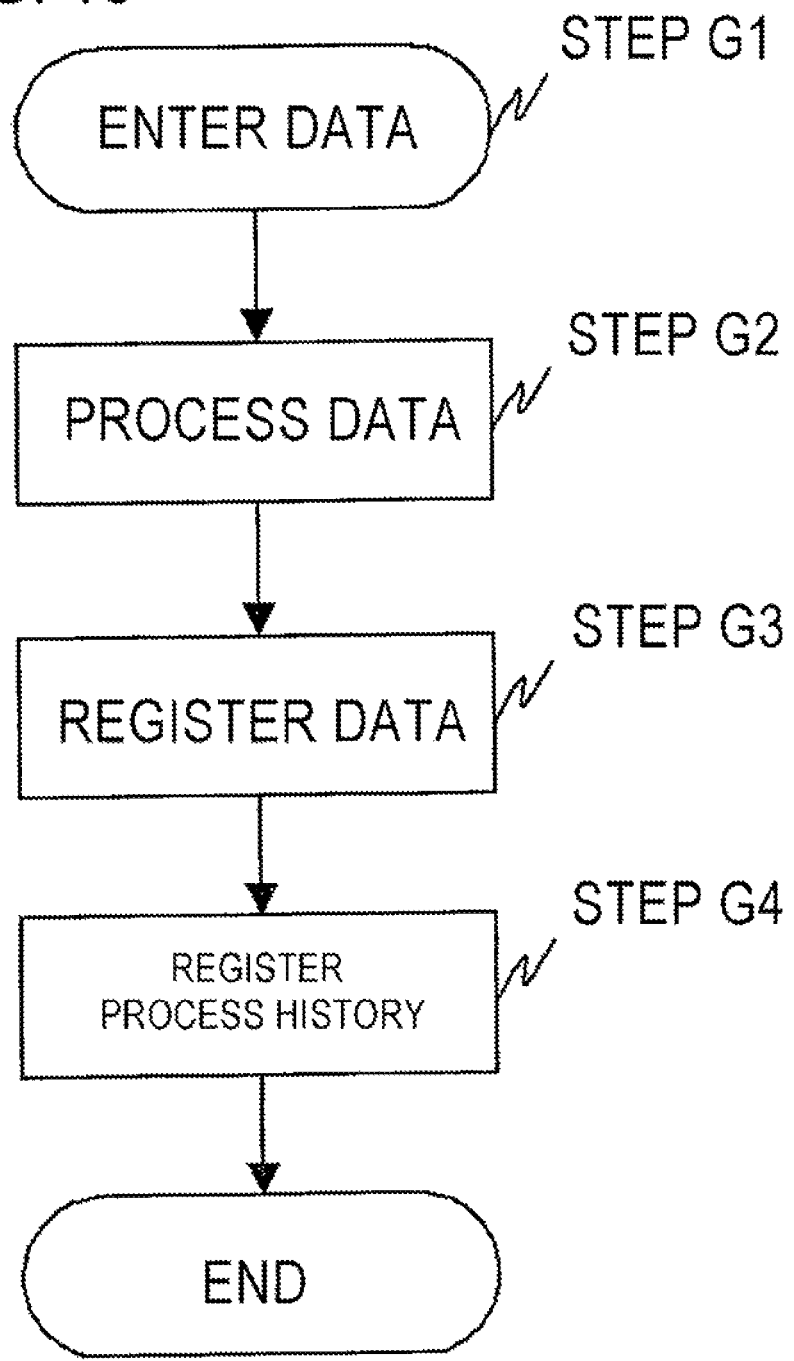
FIG. 18 is a flowchart showing a process example of a processing unit 22c.

Referring to FIG. 18, the processing unit 22c of the embodiment performs processes in steps G1 to G4. Since the processes performed in steps G1 and G2 are processes similar to the processes performed in steps A1 and A2 in FIG. 2, respectively, they will not be described. In the first embodiment, in the case where the processing unit 22 stores data, the storage location of the stored data is not mentioned. In the fourth embodiment, in the case where the processing unit 22c stores data, the data is registered in the data storing unit 29 (step G3). Further, at the time of registering a process history in the process history storing unit 25, the processing unit 22c registers a process history including the data storage location information (step G4).

In the case of changing/erasing data provided by the user of the terminal device 1 to the manager device 2c, the user of the terminal device 1 enters a data change/erasure request from the input unit 11. The request is transmitted to the manager device 2c via a network. The data change/erasure request includes request type information indicating of a data change request or a data erasure request and the provider ID designated to the user. Further, in the case of a data change request, data after a change is also included.

Figure 19:
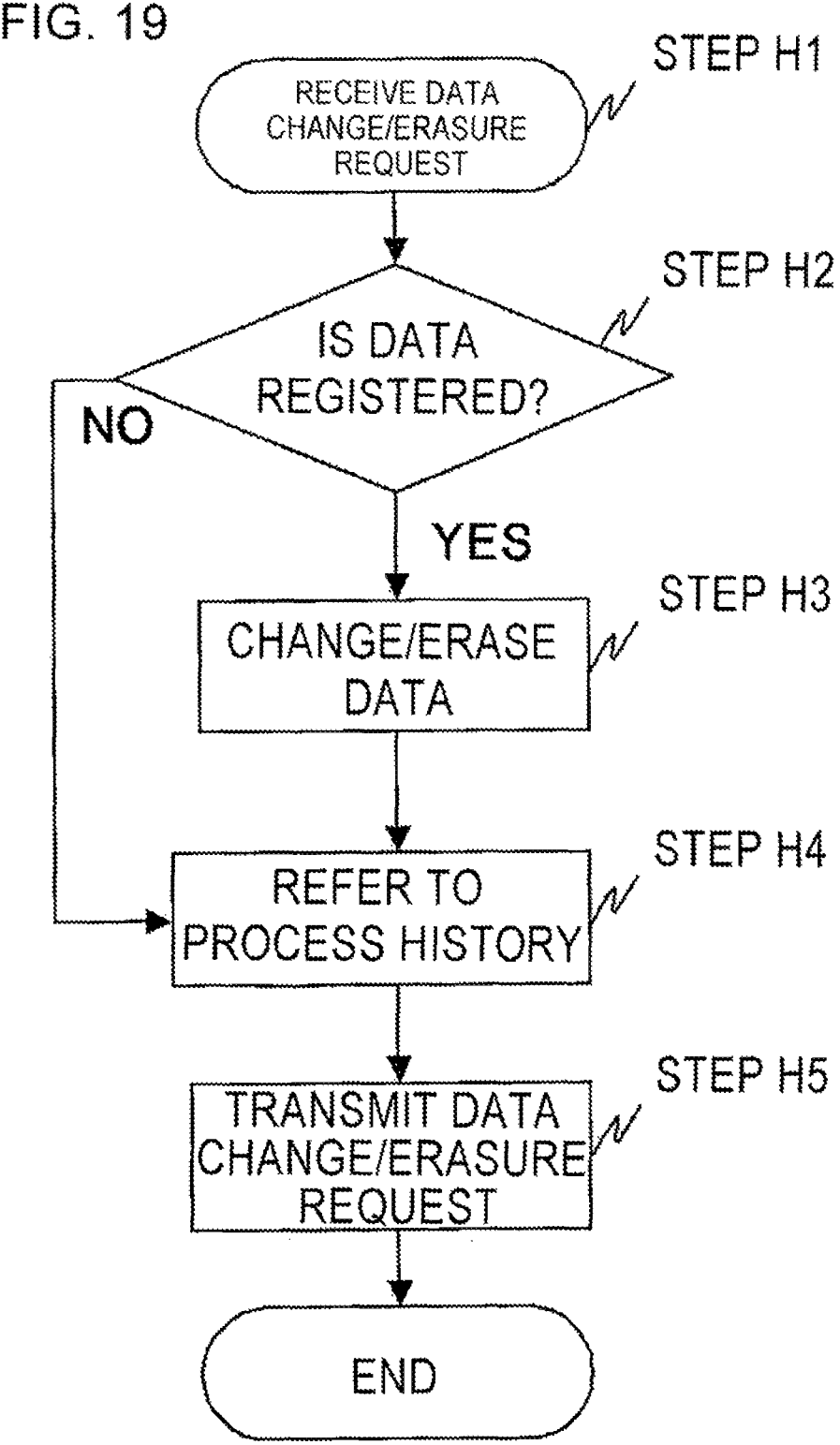
FIG. 19 is a flowchart showing a process example of a managing unit 28.

Further, referring to FIG. 19, the manager device 2c receives the data change/erasure request by the managing unit 28 (step H1), and the managing unit 28 determines whether target data is registered in the data storing unit 29 with reference to the process history storing unit 25 (step H2). The determination is performed based on, for example, whether a history request including the same provider ID as that in the request and in which the process type is "storage" is registered.

In the case where the history request is registered, the storage location of the target data is obtained with reference to the process history storing unit 25, and the target data is changed or erased (YES in step H2, step H3). After that, the managing unit 28 specifies an agent device as a transmission destination (distribution destination) of the target data with reference to the process history storing unit 25 and transmits the data change/erasure request to the device (steps H4 and H5).

On the other hand, in the case where the history request is not registered (NO in step H2), step H3 is skipped, and the process in step H4 is performed.

Assuming now that, for example, the agent device 3c is specified as a transmission destination of target data and the data change/erasure request is transmitted to the agent device 3c, the request is received by the managing unit 38 in the agent device 3c. On receipt of the data change/erasure request, the managing unit 38 performs processes similar to those of the managing unit 28.

Concrete Example of Operation of Fourth Embodiment

Assuming now that, for example, like the concrete example of the first embodiment, the pieces of data D1 to D3 are sequentially transmitted from the terminal device 1 to the manager device 2c, and "disclosure", "storage", "concealment", and "transmission of data to the agent device 3c" are performed or the pieces of the data D1 to D3 by the processing unit 22c in the manager device 2c. When the storing process is performed, as shown in FIG. 20, the pieces of data D1, D2, and D3 are registered in storage locations PKEY1, PKEY2, and PKEY3 in the data storing unit 29, respectively and, further, process histories including the data storage location information are registered in the process history storing unit 25 (steps G1 to G4 in FIG. 18). By the above processes, process histories as shown in FIG. 21 are registered in the process history storing unit 25. In the example of FIG. 20, the storage location information of the pieces of the data D1 to D3 is registered as "storage (PKEY1)", "storage (PKEY2)", and "storage (PKEY3)" in the column of the data type.

When it is assumed that the process of transmitting the pieces of the data D1 to D3 to the agent device 3c is performed in step G2, the processing unit 32c in the agent device 3c performs processes similar to those performed by the processing unit 22c (steps G1 to G4 in FIG. 18). As a result, in the data storing unit 37, as shown in FIG. 24, the pieces of the data D1, D2, and D3 are registered in storage locations PKEYe1, PKEYe2, and PKEYe3, respectively. In the process history storing unit 35, process histories as shown in FIG. 23 are registered. In the example of FIG. 23, the storage location information of pieces of the data D1 to D3 is registered as "storage (PKEYe1)", "storage (PKEYe2)", and "storage (PKEYe3)" in the data type column.

It is assumed that the user of the terminal device 1 who has provided the pieces of the data D1 to D3 enters the data change/erasure request from the input unit 11 in order to erase all of data provided by the user himself/herself. The data change/erasure request is transmitted to the manager device 2c via the network. The request includes the request type "erasure" and the provider ID "provider A".

Figure 22:
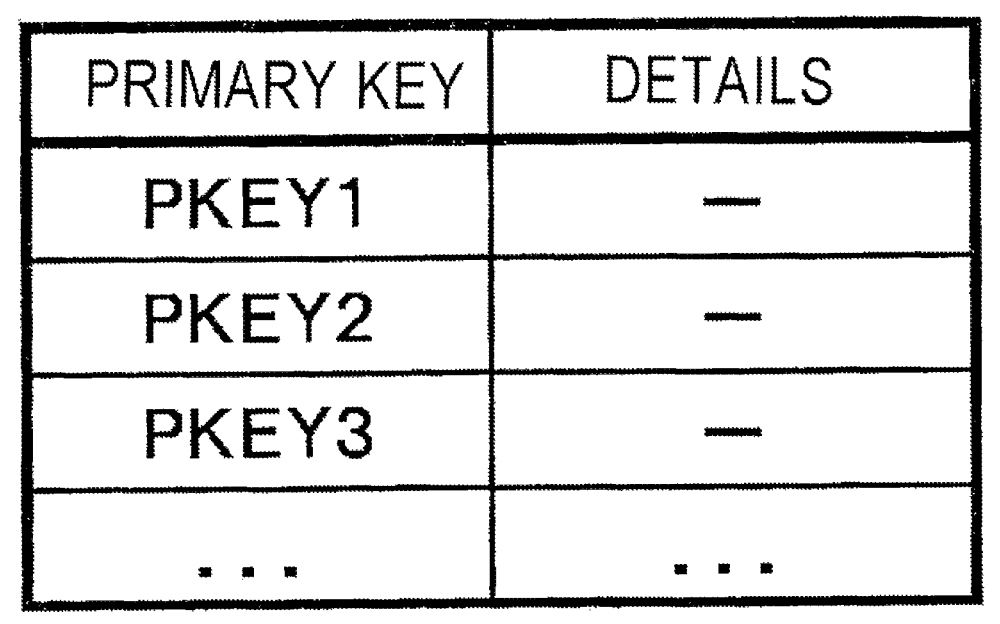

On receipt of the data change/erasure request, the managing unit 28 in the manager device 2c specifies the storage locations of the pieces of the data D1 to D3 provided by the "provider A" from the process history storing unit 25 shown in FIG. 20 and erases them from the data storing unit 29 (steps H1 to H3 in FIG. 19). Concretely, the managing unit 28 retrieves process histories in which the provider ID is "provider A" and the process type is "storage" from the process history storing unit 25 shown in FIG. 20 and erases the corresponding pieces of the data D1, D2, and D3 from the data storing unit 29 as shown in FIG. 22 based on the storage location information PKEY1, PKEY2, and PKEY3 which are set in the process type items in the retrieved process histories.

After that, the managing unit 28 specifies an agent device as a transmission destination of the pieces of the data D1 to D3 from the process history storing unit 25 and transmits the data change/erasure request to the agent device (steps H4 and H5 in FIG. 19). Concretely, the managing unit 28 retrieves a process history in which the provider ID is "provider A" and the process type is "transmission" from the process history storing unit 25 shown in FIG. 20 and transmits the data change/erasure request to the agent device indicated by the transmission destination "AGT1" which is set in the process type item in the retrieved process history.

Assuming now that, for example, the data update/erasure request is transmitted to the agent device 3c, the managing unit 38 in the agent device 3c specifies the storage locations (PKEYe1, PKEYe2, and PKEYe3) of the pieces of the data D1, D2, and D3 from the process history storing unit 35 shown in FIG. 23 and erases the pieces of the data D1 to D3 as shown in FIG. 25 (H1 to H3 in FIG. 19). After that, the managing unit 38 performs a process of specifying a transmission destination of the pieces of the data D1 to D3 with reference to the process history storing unit 35 (step H4). In the case of the example, a process history in which the provider ID is "provider A" and the process type is "transmission" is not stored in the process history storing unit 35 shown in FIG. 23, the managing unit 38 finishes the process.

Effect of Fourth Embodiment

According to the embodiment, an effect such that the data provider himself/herself can erase or change data provided to the manager device 2c and data transferred to the agent device 3c can be obtained. The reason is that the managing unit 28 is provided, which changes or erases data requested to be changed or erased by a data change/erasure request transmitted from the terminal device 1, in the data stored in the data storing unit 29, and transmits the data change/erasure request to an agent device that transmits data requested to be changed or erased by the data change/erasure request.

Although the present invention has been described above by referring to the embodiments, the invention is not limited to the embodiments. The configuration and the details of the present invention can be subjected to various changes which can be understood by a person skilled in the art within the scope of the invention.

The various components of the present invention do not always have to be independent of one another. A plurality of components may be formed as a component, one component may be formed by a plurality of components, a component may be a part of another component, a part of a component and a part of another component may be overlapped, or the like.

Further, the present invention includes the following aspects.

(1) A first data use status tracking system according to the present invention includes a manager device having:

a manager-side process history storing unit;

a manager-side processing unit that processes data transmitted from a terminal device and registers a process history including the process details of the data and data specifying information that specifies the data into the manager-side process history storing unit; and a manager-side referring unit that transmits a counting result of a process history related to data designated by a process history reference request transmitted from a terminal device, out of process histories registered in the manager-side process history storing unit, which is a counting result having counting items of the number according to the type of the terminal device, to the terminal device.

(2) A first manager device according to the invention has:

a manager-side process history storing unit;

a manager-side processing unit that processes data transmitted from a terminal device and registers a process history including the process details of the data and data specifying information that specifies the data into the manager-side process history storing unit; and a manager-side referring unit that transmits a counting result of a process history related to data designated by a process history reference request transmitted from a terminal device, out of process histories registered in the manager-side process history storing unit, which is a counting result having counting items of the number according to the type of the terminal device, to the terminal device.

(3) A first agent device according to the present invention is a component of a data use status tracking system having the agent device and a manager device including: a manager-side process history storing unit; a manager-side processing unit performing a process of processing data transmitted from a terminal device and registering a process history including the process details of the data and data specifying information that specifies the data into the manager-side process history storing unit, a process of transmitting the data to the agent device, and a process of registering a process history transmitted from the agent device into the manager-side process history storing unit; and a manager-side referring unit that transmits a counting result of a process history related to data designated by a process history reference request transmitted from a terminal device, out of process histories registered in the manager-side process history storing unit, which is a counting result having counting items of the number according to the type of the terminal device, to the terminal device, the agent device including:

an agent-side process history storing unit;

an agent-side processing unit that processes the data transmitted from the manager device and registers a process history including the process details on the data and data specifying information that specifies the data into the agent-side process history storing unit; and a process history transmitting unit that transmits the process histories registered in the agent-side process history storing unit to the manager device.

(4) A first data use status tracking method according to the present invention includes:

processing data received from a terminal device and registering a process history including the details of the process and data specifying information that specifies the data into a manager-side process history storing unit by a manager computer; and transmitting a counting result of a process history related to data designated by a process history reference request transmitted from a terminal device, out of process histories registered in the manager-side process history storing unit, which is a counting result having counting items of the number according to the type of the terminal device, to the terminal device, by the manager computer.

(5) A first program according to the present invention is a program for making a computer having a manager-side process history storing unit function as a manager device, and makes the computer function as:

a manager-side processing unit that processes data transmitted from a terminal device and registers a process history including the process details of the data and data specifying information that specifies the data into the manager-side process history storing unit; and a manager-side referring unit that transmits a counting result of a process history related to data designated by a process history reference request transmitted from a terminal device, out of process histories registered in the manager-side process history storing unit, which is a counting result having counting items of the number according to the type of the terminal device, to the terminal device.

The present invention is suitably used for a web server or the like which provides service specialized for individuals based on privacy data transmitted from the user.

The invention claimed is:

1. A data use status tracking system including:

a terminal device that generates and transmits data;

a manager device that receives said data transmitted from said terminal device, and transmits the data; and an agent device that receives said data transmitted from said manager device, wherein said agent device comprising:

an agent-side hardware processor;

an agent-side processing unit executed by the agent-side hardware processor, that receives said data transmitted from said manager-device, processes the data received from said manager device, and produces agent-side process histories showing how the agent-side processing unit processes the data received from the manager device;

an agent-side process history storing unit executed by the agent-side hardware processor, that acquires said agent-side process histories from said agent-side processing unit, and stores the agent-side process histories; and a process history transmitting unit executed by the agent-side hardware processor, that transmits a part or all of said agent-side process histories stored in said agent-side process history storing unit to said manager device, wherein said manager device comprising:

a manager-side hardware processor;

a manager-side processing unit executed by the manager-side hardware processor, that receives said data from said terminal device, transmits the data received from said terminal device to said agent device, processes the data received from said terminal device, and produces manager-side process histories showing how the manager-side processing unit processes the data received from the terminal device;

a manager-side process history storing unit executed by the manager-side hardware processor, that acquires said manager-side process histories from said manager-side processing unit, stores the manager-side process histories, receives a part or all of said agent-side process histories from said agent device, and stores the agent-side process histories; and a manager-side referring unit executed by the manager-side hardware processor, that receives a process history reference request designating a part or all of said manager-side process histories and/or said agent-side process histories stored in said manager-side process history storing unit from said terminal device and obtains a plurality of counting results by counting a plurality of counting items within said manager-side process histories and/or said agent-side process histories designated by said process history reference request, chooses a counting result from the plurality of counting results according to a type of the terminal device, and transmits, as a response to the process history reference request, the chosen counting result to the terminal device.

2. The data use status tracking system as set forth in claim 1, wherein on receipt of said process history reference request from said terminal device, said manager-side referring unit retrieves said manager-side process histories and/or said agent-side process histories designated by the process history reference request from said manager-side process history storing unit, counts the retrieved manager-side process histories and/or the retrieved agent-side process histories with respect to a counting item according to a type of the terminal device, and transmits, as a response, said counting result obtained by the counting to the terminal device.

3. The data use status tracking system as set forth in claim 1, said manager device further comprising:
a counting result storing unit executed by the manager-side hardware processor; and
an analyzing unit executed by the manager-side hardware processor that counts said manager-side process histories and/or said agent-side process histories stored in said manager-side process history storing unit with respect to a plurality of counting items and registers said counting result obtained by the counting in said counting result storing unit,
wherein when said process history reference request is received from said terminal device, said manager-side referring unit retrieves said counting result based on said process history reference request received and a type of the terminal device and transmits, as a response, the retrieved counting result to the terminal device.

4. The data use status tracking system as set forth in claim 3,
wherein said analyzing unit registers a detailed counting result group including said counting results obtained by counting said manager-side process histories and/or said agent-side process histories stored in said manager-side process history storing unit with respect to the plurality of counting items and a simplified counting result group including said counting results obtained by counting the manager-side process histories and/or the agent-side process histories with respect to a part of said counting items in said detailed counting result in said counting result storing unit, and
when said process history reference request is received from said terminal device, said manager-side referring unit selects either said detailed counting result group or said simplified counting result group according to the type of the terminal device, retrieves said counting result related to said manager-side process histories and/or said agent-side process histories designated by the process history reference request from said detailed counting result group or said simplified counting result group selected, and transmits, as a response, said retrieved counting result to the terminal device.

5. The data use status tracking system as set forth in claim 1, wherein said agent device further comprising:
an agent-side referring unit executed by the agent-side hardware processor, that receives a process history reference request designating a part or all of said agent-side process histories stored in said agent-side process history storing unit from said manager device and transmits, as a response, said counting result related to a counting item according to type of the terminal device, out of said counting results obtained by counting said agent-side process histories designated by said process history reference request, to said manager device,
wherein when the manager device receives said process history reference request from the terminal device, the manager device transmits the process history reference request to said agent device by said manager-side processing unit, retrieves said manager-side process history designated by the process history reference request by the manager-side referring unit from said manager-side process history storing unit, and counts the retrieved manager-side process histories with respect to said counting item according to the type of the terminal device,
when the manager device receives said counting result from said agent device, the manager device integrates said counting result received and said counting result of counting performed by said manager-side referring unit, and transmits, as a response, the resultant to said terminal device which has transmitted the process history reference request.

6. The data use status tracking system as set forth in claim 1, said manager device further comprising:
a manager-side data storing unit executed by the manager-side hardware processor, that stores said data received from said terminal device; and
a manager-side managing unit executed by the manager-side hardware processor, that changes or erases said data stored in said manager-side data storing unit and requested by a data change/erasure request received from said terminal device.

7. The data use status tracking system as set forth in claim 6,
wherein said manager-side managing unit of said manager device transmits said data change/erasure request to said agent device to which said data requested to be changed or erased in the data change/erasure request was transmitted by the manager device, and
said agent device further comprising:
an agent-side data storing unit executed by the agent-side hardware processor, that stores said data received from said manager device; and
an agent-side managing unit executed by the agent-side hardware processor, that changes or erases data stored in the agent-side data storing unit and requested to be changed or erased by said data change/erasure request received from said manager device.

8. The data use status tracking system as set forth in claim 1, wherein a type of said terminal device is determined by size of a display region in the terminal device.

9. The data use status tracking system as set forth in claim 8, further comprising a manager-side referring unit executed by the manager-side hardware processor, that counts more said counting items when receiving said process history reference request from said terminal device having larger display region.

10. The data use status tracking system as set forth in claim 1, wherein as types of said terminal device, a portable terminal and a terminal device other than the portable terminal exist.

11. The data use status tracking system as set forth in claim 1, wherein said counting items include a process type and the number of execution times in a past predetermined period of a process by said process type.

12. A manager device connected with a terminal device generating data and transmitting the data to the manager device, and connected with an agent device including:
an agent-side hardware processor;
an agent-side processing unit executed by the agent-side hardware processor, that receives data transmitted from said manager-device, processes the data received from said manager device, and produces agent-side process histories showing how the agent-side processing unit processes the data received from the manager device;
an agent-side process history storing unit executed by the agent-side hardware processor, that acquires said agent-side process histories from said agent-side processing unit, and stores the agent-side process histories; and a process history transmitting unit executed by the agent-side hardware processor, that transmits a part or all of said agent-side process histories stored in said agent-side process history storing unit to said manager device, and said manager device including:

a manger-side hardware processor;

a manager-side processing unit executed by the manager-side hardware processor, that receives data from said terminal device, transmits the data received from said terminal device to said agent device, processes the data received from said terminal device, and produces manager-side process histories showing how the manager-side processing unit processes the data received from the terminal device, a manager-side process history storing unit executed by the manager-side hardware processor, that acquires said manager-side process history from said manager-side processing unit, stores the manager side process histories, receives a part or all of said agent-side process histories from said agent device, and stores the agent-side process histories;

a manager-side referring unit executed by the manager-side hardware processor, that receives a process history reference request designating a part or all of said manager-side process histories and/or said agent-side process histories stored in said manager-side process history storing unit from said terminal device and obtains a plurality of counting results by counting a plurality of counting items within said manager-side process histories and/or said agent-side process histories designated by said process history reference request chooses a counting result from the plurality of counting results according to a type of the terminal device, and transmits, as a response to the process history reference request, the chosen counting result to the terminal device.

13. The manager device as set forth in claim 12, wherein when said process history reference request is received from said terminal device, the manager-side referring unit retrieves said manager-side process histories and/or the agent-side process histories designated by the process history reference request from said manager-side process history storing unit, counts the manager-side process histories and/or the agent-side process histories retrieved with respect to counting items according to the type of the terminal device, and transmits, as a response, said counting result obtained by the counting to the terminal device.

14. The manager device as set forth in claim 12, further comprising:

a counting result storing unit executed by the manager-side hardware processor; and an analyzing unit executed by the manager-side hardware processor, that counts said manager-side process histories and/or said agent-side process histories stored in said manager-side process history storing unit with respect to a plurality of counting items and registers said counting result obtained by the counting in said counting result storing unit, wherein when said process history reference request is received from said terminal device, said manager-side referring unit retrieves said counting result based on said process history reference request received and the type of the terminal device and transmits, as a response, the retrieved counting result to the terminal device.

15. The manager device as set forth in claim 14, wherein said analyzing unit registers a detailed counting result group including said counting results obtained by counting said manager-side process histories and/or said agent-side process histories stored in said manager-side process history storing unit with respect to said plurality of counting items and a simplified counting result group including said counting results obtained by counting the manager-side process histories and/or said agent-side process histories with respect to a part of said counting items in said detailed counting result in said counting result storing unit, and when said process history reference request is received from said terminal device, said manager-side referring unit selects either said detailed counting result group or said simplified counting result group according to the type of the terminal device, retrieves said counting result related to said manager-side process histories and/or said agent-side process histories designated by the process history reference request from said detailed counting result group or said simplified counting result group selected, and transmits, as a response, said retrieved counting result to the terminal device.

16. The manager device as set forth in claim 12, wherein said agent device further comprises an agent-side referring unit executed by the agent-side hardware processor, that receives a process history reference request designating a part or all of said process histories registered in said agent-side process history storing unit from said manager device and transmits, as a response, said counting result related to a counting item according to the type of the terminal device, out of said counting results obtained by counting said process histories designated by said process history reference request, to said manager device, when said data is received from said terminal device, the data is transmitted to the agent device by said manager-side processing unit, the data is processed by said manager-side processing unit, said manager-side process histories are stored in said manager-side process history storing unit, when said process history reference request is received from the terminal device, the process history reference request is transmitted to said agent device by said manager-side processing unit, said manager-side process history designated by the process history reference request is retrieved by the manager-side referring unit from said manager-side process history storing unit, the retrieved manager-side process histories are counted with respect to said counting item according to the type of the terminal device, and when said counting result is received from said agent device, said counting result received and said counting result of counting performed by said manager-side referring unit are integrated, and the resultant is transmitted, as a response, to said terminal device which has transmitted the process history reference request.

17. The manager device as set forth in claim 12, further comprising:

a manager-side data storing unit executed by the manage side hardware processor, that stores said data received from said terminal device; and a manager-side managing unit executed by the manager-side hardware processor, that changes or erases said data stored in said manager-side data storing unit and requested by a data change/erasure request received from said terminal device.

18. The manager device as set forth in claim 12, further comprising:
- a manager-side data storing unit executed by the manager-side hardware processor, that stores said data received from said terminal device; and
- a manager-side managing unit executed by the manage side hardware processor, that changes or erases said data stored in said manager-side data storing unit and requested by a data change/erasure request received from said terminal device, and transmits said data change/erasure request to said agent device to which said data requested to be changed or erased in the data change/erasure request was transmitted by the manager device, and said agent device further comprising:
- an agent-side data storing unit executed by the agent-side hardware processor, that stores said data received from said manager device; and
- an agent-side managing unit executed by the agent-side hardware processor, that changes or erases data stored in said agent-side data storing unit and requested to be changed or erased by said data change/erasure request received from said manager device.

19. An agent device connected so as to be able to perform communication with a manager device including:
- a manager-side hardware processor;
- a manager-side processing unit executed by the manager-side hardware processor, that receives data from a terminal device, transmits the data received from said terminal device to said agent device, processes the data received from said terminal device, and produces manager-side process histories showing how the manager-side processing unit processes the data received from the terminal device;
- a manager-side process history storing unit executed by the manager-side hardware processor, that acquires said manager-side process histories from said manager-side processing unit, stores the manager-side process histories, receives a part or all of said agent-side process histories from said agent device, and stores the agent-side process histories;
- a manager-side referring unit executed by the manager-side hardware processor, that receives a process history reference request designating a part or all of said manager-side process histories and/or said agent-side process histories stored in said manager-side process history storing unit from said terminal device, and obtains a plurality of counting results by counting a plurality of counting items within said manager-side process histories and/or said agent-side process histories designated by said process history reference request, chooses a counting result from the plurality of counting results according to a type of the terminal device, and transmits, as a response to the process history reference request, the chosen counting result to the terminal device, and said agent device comprising:
- an agent-side hardware processor;
- an agent-side processing unit executed by the agent-side hardware processor, that receives said data transmitted from said manager-device, processes the data received from said manager device, and produces agent-side process histories showing how the agent-side processing unit processes the data received from the manager device;
- an agent-side process history storing unit executed by the agent-side hardware processor, that acquires said agent-side process histories from said agent-side processing unit, and stores the agent-side process histories; and
- a process history transmitting unit executed by the agent-side hardware processor, that transmits a part or all of said agent-side process histories stored in said agent-side process history storing unit to said manager device.

20. A data use status tracking method comprising:
receiving by a manager computer, data transmitted from a terminal device generating said data and transmitting said data to the manager computer, transmitting by the manager computer, the data received from said terminal device to an agent computer, processing by the manager computer, the data received from the said terminal device, producing by the manager computer, manager-side process histories showing how the manager computer processes the data, and storing by the manager computer, the manager-side process histories in a manager-side process history memory, wherein said agent computer receives the data transmitted from said manager computer, processes the data transmitted from said manager computer, produces agent-side process histories showing how the agent computer processes the data transmitted from said manager computer in an agent-side process history memory, and transmits to said manager computer a part or all of said agent-side process histories stored in said agent-side process history memory; and said manager computer receives a process history reference request designating a part or all of said manager-side process histories and/or said agent-side process histories stored in said manager-side process history memory from said terminal device and obtains a plurality of counting results by counting a plurality of counting items within said manager-side process histories and/or said agent-side process histories designated by said process history reference request, chooses a counting result from the plurality of counting results according to a type of the terminal device, and transmits, as a response to the process history reference request, the chosen counting result to the terminal device.

21. The data use status tracking method as set forth in claim 20, wherein when said manager computer receives said process history reference request from said terminal device, said manager computer retrieves said manager-side process histories and/or said agent-side process histories designated by the process history reference request from said manager-side process history memory, counts the retrieved manager-side process histories and/or the retrieved said agent-side process histories with respect to a counting item according to a type of the terminal device, and transmits said count result obtained by the counting as a response to the terminal device.

22. The data use status tracking method as set forth in claim 20, wherein said manager computer counts said manager-side process histories and/or said agent-side process histories stored in said manager-side process history memory with respect to a plurality of counting items and registers said counting result obtained by the counting in a counting result memory, and when said manager computer receives said process history reference request from said terminal device, said manager computer retrieves said counting result based on said process history reference request received and the type of the terminal device, and transmits the retrieved counting result as a response to the terminal device.

23. The data use status tracking method as set forth in claim 22, wherein said manager computer stores in said counting result memory a detailed counting result group including said counting results obtained by counting said manager-side process histories and/or said agent-side process histories stored in said manager-side process history memory with respect to the plurality of counting items and a simplified counting result group including said counting results obtained by counting the manager-side process histories and/or the agent-side process histories with respect to a part of said counting items in said detailed counting result, and when said manager computer receives said process history reference request from said terminal device, said manager computer selects either said detailed counting result group or said simplified counting result group according to the type of the terminal device, retrieves said counting result related to said manager-side process histories and/or said agent-side process histories designated by the process history reference request from said detailed counting result group or said simplified counting result group selected, and transmits said retrieved counting result as a response to the terminal device.

24. The data use status tracking method as set forth in claim 20, further comprising:

receiving by an agent computer, a process history reference request designating a part or all of said agent-side process histories stored in said agent-side process history memory from said managing computer, and transmitting by the agent computer, as a response, said counting result related to a counting item according to the type of the terminal device, out of said counting results obtained by counting said agent-side process histories designated by said process history reference request, to said manager computer, wherein when said manager computer receives said process history reference request from said terminal device, said manager computer transmits the process history reference request to said agent computer, retrieves said manager-side process histories designated by the process history reference request from said manager-side process history memory, and counts the retrieved manager-side process histories with respect to said counting item according to the type of the terminal device, and when said manager computer receives said counting result from said agent computer, said manager computer integrates said counting result received from said agent computer and said counting result of the counting the manager computer performed, and transmitting, as a response, the resultant to said terminal device which has transmitted the process history reference request.

25. The data use status tracking method as set forth in claim 20, further comprising:

storing by said manager computer, said data received from said terminal device; and changing or erasing by said manager computer, said data stored by said manager computer and requested by a data change/erasure request received from said terminal device.

26. The data use status tracking method as set forth in claim 20, further comprising:

storing by said manager computer, said data received from said terminal device;

changing or erasing by said manager computer, said data stored by said manager computer and requested by a data change/erasure request received from said terminal device, and transmitting by said manager computer, said data change/erasure request to said agent computer to which said data requested to be changed or erased in the data change/erasure request was transmitted by said manager computer;

storing by said agent computer, said data received from said manager computer; and changing or erasing by said agent computer, data stored by said agent computer and requested to be changed or erased by said data change/erasure request received from said manager computer.

27. A non-transitory computer readable medium storing a program that makes:

a manager computer receive data transmitted from a terminal device generating said data and transmitting said data to the manager computer, transmit the data to an agent computer, process the data, produce manager-side process histories showing how the manager computer processes data received from said terminal device, and stores the manager-side process histories in a manager-side process history memory;

said agent computer receive the data transmitted from said manager computer, process the data transmitted from said manager computer, produce agent-side process histories showing how the agent computer processes the data transmitted from said manager computer in an agent-side process history memory, and transmit to said manager computer a part or all of said agent-side process histories registered in said agent-side process history memory; and said manager computer receive a process history reference request designating a part or all of said manager-side process histories and/or said agent-side process histories stored in said manager-side process history memory from said terminal device, and obtain a plurality of counting results by counting a plurality of counting items within said manager-side process histories and/or said agent-side process histories designated by said process history reference request, choose a counting result from the plurality of counting results according to a type of the terminal device, and transmit, as a response to the process history reference request, the chosen counting result to the terminal device.

* * * * *